(12) United States Patent  
Samain

(10) Patent No.: US 12,571,164 B2  
(45) Date of Patent: Mar. 10, 2026

(54) METHOD AND DEVICE FOR ACYLATING A MOVING HYDROXYLATED MATERIAL

(71) Applicant: CELLULOTECH INC, Victoria (CA)

(72) Inventor: Daniel Samain, Toulouse (FR)

(73) Assignee: CELLULOTECH INC, Victoria (CA)

( * ) Notice: Subject to any disclaimer, the term of this patent is extended or adjusted under 35 U.S.C. 154(b) by 217 days.

(21) Appl. No.: 18/255,270

(22) PCT Filed: Dec. 1, 2020

(86) PCT No.: PCT/FR2020/052238  
§ 371 (c)(1),  
(2) Date: May 31, 2023

(87) PCT Pub. No.: WO2022/117926  
PCT Pub. Date: Jun. 9, 2022

(65) Prior Publication Data  
US 2025/0075434 A1 Mar. 6, 2025

(51) Int. Cl.  
*B01J 19/22* (2006.01)  
*B01J 15/00* (2006.01)  
*B01J 16/00* (2006.01)  
*D21H 25/06* (2006.01)

(52) U.S. Cl.  
CPC .............. *D21H 25/06* (2013.01); *B01J 15/00* (2013.01); *B01J 16/00* (2013.01); *B01J 19/22* (2013.01); *B01J 2219/00159* (2013.01); *B01J 2219/00186* (2013.01)

(58) Field of Classification Search  
CPC ... B01J 19/22; B01J 16/00; B01J 15/00; B01J 2219/00159; B01J 2219/00186; D21H 25/02; D21H 25/06  
See application file for complete search history.

(56) References Cited

U.S. PATENT DOCUMENTS

2017/0241080 A1 8/2017 Eichholz

FOREIGN PATENT DOCUMENTS

| FR | 3075071 A1 | 6/2019 |
| WO | 2009/083525 A1 | 7/2009 |
| WO | 2017/002005 A1 | 1/2017 |

*Primary Examiner* — Lessanework Seifu  
(74) *Attorney, Agent, or Firm* — NEXUS IP LAW PLLC

(57) ABSTRACT

The invention relates to a process for the acylation of a solid material, known as the hydroxylated material, bearing hydroxyl groups (—OH), known as reaction-generating hydroxyls, which are accessible and capable of reacting with at least one fatty acid chloride in gaseous form, said hydroxylated material being scrolled through a chamber, known as the acylation chamber, delimiting an internal space under a gaseous atmosphere. The invention also relates to an acylation device for performing said process.

14 Claims, 4 Drawing Sheets

METHOD AND DEVICE FOR ACYLATING A MOVING HYDROXYLATED MATERIAL

CROSS REFERENCE TO RELATED APPLICATIONS

The present application is a § 371 national stage of International Application PCT/FR2020/052238, filed Dec. 1, 2020, which is hereby incorporated herein by reference in its entirety.

FIELD OF THE INVENTION

The invention relates to a process and a device for the acylation by chromatogenic synthesis of a solid "hydroxylated" material, bearing hydroxyl groups (—OH), known as reaction-generating hydroxyls, which are accessible and capable of reacting with a fatty acid chloride in gaseous form, said hydroxylated material being scrolled.

BACKGROUND OF THE INVENTION

WO 2012/066015 discloses a process for the acylation of a scrolled hydroxylated substrate, performed using an acylation device comprising:
- an upstream reel designed to receive a coil of hydroxylated substrate;
- a device for applying a grafting reagent to a hydroxylated face of a scrolling hydroxylated substrate;
- a rotating heating roll in a cowl forming, with the heating roll, a gap for receiving the scrolled hydroxylated substrate on contact with the heating roll;
- a bar feeding system associated with the heating roll, for placing the face opposite the hydroxylated face of the hydroxylated substrate in contact with the heating roll;
- a member, arranged downstream of the heating roll, for introducing an air knife into the gap, flowing counter-currentwise relative to the hydroxylated substrate and intended to flush the substrate, and to entrain the excess grafting reagent and the hydrochloric acid formed; and
- a hydrochloric acid extraction device located upstream of the heating roll;
- a downstream device for rewinding the treated substrate.

The inventor has found that a substrate acylated using the device of WO 2012/066015 has lower hydrophobicity than that which may be obtained by applying a solution of fatty acid chloride in pentane to this same hydroxylated substrate, followed by applying a gas stream. The process of WO 2012/066015 is not optimized. It does not give the acylated substrate hydrophobicity and water-impermeability that are optimal and sufficiently long-lasting. In this respect, the contact angle value of a drop of pure water deposited on a substrate acylated according to the process of WO 2012/066015 is, admittedly, greater than 90°, but remains below the optimum value of 150° obtained by applying a solution of fatty acid chloride in pentane. The inventor thinks that although the air knife flushing the hydroxylated substrate in the gap of the device of WO 2012/066015 makes it possible to remove the hydrochloric acid formed as a result of the reaction, it also entrains the gaseous grafting reagent, not allowing optimum reaction thereof with the hydroxylated substrate. This results in unsatisfactory hydrophobicity properties.

Solutions for improving the efficiency and yield of the acylation reaction are thus sought. In particular, such solutions are sought in order to be able to treat a hydroxylated material on a semi-industrial or industrial scale, and to convert it into an acylated material whose performance qualities in terms of hydrophobicity are satisfactory.

SUMMARY OF THE INVENTION

The invention is thus directed towards proposing a chromatogenic acylation process and a device for performing such a process making it possible to efficiently transform a solid material, bearing reaction-generating hydroxyls, which is hydrophilic due to said reaction-generating hydroxyls, into a hydrophobic and water-impermeable material.

In particular, the invention is directed towards proposing such a process and such a device for producing acylated paper material which is air-permeable and water-impermeable.

More particularly, the invention is directed towards proposing such a process and such a device for the production of acylated paper material for decontamination by filtration.

The invention is thus directed towards proposing such a process and such a device for acylating a hydroxylated material consisting essentially of cellulose fibres.

The invention is also directed towards proposing such a process and such a device for acylating a hydroxylated material enabling optimization of the acylation reaction by chromatogenic synthesis.

The invention is directed in particular towards proposing such a process and such a device for acylating a paper material in the form of a scrolled width.

The invention thus relates to a process for the acylation of a solid material, known as the hydroxylated material, bearing hydroxyl groups (—OH), known as reaction-generating hydroxyls, which are accessible and capable of reacting with at least one fatty acid chloride in gaseous form, in which:
- said hydroxylated material is scrolled through a chamber, known as the acylation chamber, delimiting an internal space under a gaseous atmosphere;
- a fatty acid chloride in liquid form is applied to the surface of said scrolled hydroxylated material;
- the gaseous atmosphere of said acylation chamber is heated so that the temperature of the gaseous atmosphere in contact with said scrolled hydroxylated material in said acylation chamber is at a temperature, known as the grafting temperature (Tg), below the vaporization temperature of the fatty acid chloride—notably between 150° C. and 220° C., in particular about 180° C.—and sufficient to allow acylation of said hydroxylated material passing through said acylation chamber;
- a stream of a gaseous composition-notably a stream of atmospheric air-flowing from downstream to upstream in said acylation chamber counter-currentwise relative to said scrolled hydroxylated material is maintained;

whereby:
- a scrolled material, known as the acylated material, is formed as a result of an acylation reaction by covalent grafting taking place in said acylation chamber between at least a portion of said reaction-generating hydroxyls and fatty acid chloride in gaseous form; and
- gaseous hydrochloric acid produced as a result of the acylation reaction is entrained from downstream to upstream by the stream of gaseous composition; characterized in that the stream of the gaseous composition is adjusted so that fatty acid chloride (in gaseous form or in aerosol liquid form dispersed in the gaseous atmosphere of said acylation chamber) is maintained in the gaseous atmosphere of said acylation chamber at a concentration such that the fatty acid chloride in gaseous form is present in the gaseous atmosphere of said acylation chamber with a partial pressure substantially equal to the saturating vapour pressure of the fatty acid chloride at said grafting temperature (Tg).

Throughout the text:

the expression "hydroxylated/acylated material" denotes a material which, when introduced into said acylation reactor in a hydroxylated form (free hydroxyls), is converted during its scrolling in the acylation chamber into an at least partially acylated material, in which at least a portion of the hydroxyl groups of said hydroxylated material is converted into acyl groups of said acylated material; and the terms "upstream" and "downstream" are defined relative to the direction of scrolling of said hydroxylated material from a reel of said hydroxylated material lying upstream of said acylation chamber, towards a member for collecting a material which is acylated as a result of the acylation reaction, the collection member lying downstream of said acylation chamber. As regards the direction of circulation of the stream of gaseous composition counter-currentwise relative to the direction of scrolling of the hydroxylated/acylated material in said acylation chamber, the definitions of the terms "upstream" and "downstream", defined relative to the direction of scrolling of said hydroxylated/acylated material, are conserved throughout the text. The stream of gaseous composition flows counter-currentwise relative to said hydroxylated/acylated material and globally from downstream of said acylation chamber and of the acylation reactor to upstream of said acylation chamber and of the acylation reactor.

The invention thus relates to a process for the industrial and/or preindustrial treatment at atmospheric pressure of a strip or width—notably conditioned as a roll or as folded sheets—of a hydroxylated material, i.e. of a material bearing free, reaction-generating hydroxyl groups, which are accessible and capable of reacting with at least one fatty acid chloride in gaseous form, for the purpose of its acylation, said hydroxylated material being scrolled in said acylation chamber along the longitudinal axis of the strip of said hydroxylated/acylated material.

According to the general principle of a chromatogenic acylation reaction, a fatty acid chloride, notably a long-chain fatty acid chloride, reacts in gaseous form with a reaction-generating hydroxyl of the hydroxylated material to form an ester bond between said hydroxylated material and the hydrocarbon-based fatty chain (R) of the fatty acid chloride, according to equation (I) below:

$$\text{Material-OH} + \text{R—CO—Cl} \leftrightarrows \text{Material-O—CO—R} + \text{HCl}$$ (I).

The chromatogenic acylation reaction applied to a cellulose-based material bearing such reaction-generating hydroxyls, such as paper, is known in particular. Employing reaction-generating and hydrophilic hydroxyls of the cellulose-based material in ester bonds formed with hydrocarbon-based fatty chains (R) allows an increase in the hydrophobicity of the cellulose fibres of the acylated cellulose-based material, giving it hydrophobicity and water-impermeability properties. The chromatogenic acylation reaction takes place in the absence of any solvent, notably of any organic solvent. It proceeds in the absence of any catalyst and does not require removal of said catalyst at the end of the reaction. It takes place by heating the fatty acid chloride to a temperature below its vaporization temperature and at atmospheric pressure. It is also promoted by the fact that the gaseous hydrochloric acid (HCl) produced as a result of the reaction is entrained by a stream of gaseous composition. This entrainment makes it possible to limit, or even to totally prevent, the hydrolysis of the ester formed and to shift the reaction equilibrium in the direction of formation of the reaction products and of the acylated material (material-O—CO—R).

In a process according to the invention, the stream of gaseous composition is adjusted so as to be sufficient to entrain the hydrochloric acid formed as a result of the reaction and to shift the equilibrium of this reaction, but also so as to be small enough to maintain, in the gaseous atmosphere of said acylation chamber, fatty acid chloride at a concentration such that fatty acid chloride in gaseous form is present in the gaseous atmosphere of said acylation chamber with a partial pressure that is as close as possible to, notably substantially equal to, the saturating vapour pressure of the fatty acid chloride at said grafting temperature (Tg).

In certain embodiments of a process according to the invention, the fatty acid chloride, notably the fatty acid chloride in gaseous form, and the hydrochloric acid are quantified in at least one of the fluids chosen from the stream of gaseous composition exiting said acylation chamber and the gaseous atmosphere of said acylation chamber; and at least one, notably each, of the parameters chosen from the group formed from:

the amount of fatty acid chloride applied per unit area of said scrolled hydroxylated material;

the scrolling speed of the hydroxylated material through said acylation chamber;

the residence time of said hydroxylated material in said acylation chamber;

the flow rate of the gaseous composition;

the temperature of the gaseous composition; and said grafting temperature (Tg) in said acylation chamber;

is adjusted as a function of this quantification so as:

to maximize the concentration of gaseous hydrochloric acid; and to minimize the concentration of fatty acid chloride;

in the stream of gaseous composition upstream of said acylation chamber.

In these embodiments, at least one of the parameters mentioned above is adjusted so as to maximize the concentration of hydrochloric acid in the stream of gaseous composition at the upstream outlet of said acylation chamber, the production of a stream of gaseous composition rich in hydrochloric acid constituting an indicator of the correct progress of the acylation reaction. At least one of the parameters mentioned above is adjusted so as to minimize the concentration of fatty acid chloride in the stream of gaseous composition at the upstream outlet of said acylation chamber.

In particular, at least one of these parameters is adjusted, notably the amount of said fatty acid chloride applied to the surface of said hydroxylated material and/or said grafting temperature (Tg) and/or the stream of gaseous composition and/or the scrolling speed of said hydroxylated material and/or the residence time of said hydroxylated material in said acylation chamber, so that the concentration of the fatty acid chloride in the gaseous atmosphere of said acylation chamber, at the edges of and in contact with said hydroxylated material, corresponds substantially to the saturating vapour pressure of the fatty acid chloride at said grafting temperature (Tg).

The presence of fatty acid chloride (in gaseous form and in aerosol liquid form dispersed in the gaseous atmosphere) at an excessive concentration in the stream of gaseous composition upstream of said acylation chamber is indicative of reaction conditions that are unsuitable for allowing the reaction of a majority of the fatty acid chloride and of said hydroxylated material.

The unsuitability of these conditions may notably arise:

from an excessive amount of fatty acid chloride deposited on said hydroxylated material; and/or from an unsuitable scrolling speed of said hydroxylated material; and/or from an excessive stream of gaseous composition not making it possible to maintain in said acylation chamber a sufficient concentration of fatty acid chloride; and/or from a temperature value in said acylation chamber not enabling the acylation reaction.

In a process according to the invention, the fatty acid chloride in the stream of gaseous composition is quantified by any suitable means, provided upstream of said acylation chamber and/or in said acylation chamber. It may be quantified continuously by any known detection means, notably in the field of analytical gas chromatography (GC). Such a quantification may be performed, for example, by means of a flame ionization detector (FID) or by mass spectrometry. The hydrochloric acid may be quantified in the stream of gaseous composition by any suitable means, for example by sparging the stream of gaseous composition in an aqueous composition and pH-metric titration of this aqueous composition. Such a quantification of the hydrochloric acid and of the fatty acid chloride in the stream of gaseous composition in said acylation chamber and/or upstream of said acylation chamber allows adjustment of at least one abovementioned parameter and optimization of the acylation reaction progress.

In certain embodiments, the gaseous atmosphere of said acylation chamber is subjected to suitable blending so as:

to promote heat exchanges between said hydroxylated/acylated material and the gaseous atmosphere of said acylation chamber;

to allow the evaporation of the liquid fatty acid chloride and the diffusion of the gaseous fatty acid chloride arising in said acylation chamber;

to entrain the hydrochloric acid formed as a result of the acylation reaction and to limit the degradation of said hydroxylated/acylated material caused by this hydrochloric acid.

In combination;

a concentration value of fatty acid chloride in the gaseous atmosphere of said acylation chamber such that the partial pressure of fatty acid chloride in gaseous form is substantially equal to the saturating vapour pressure of the fatty acid chloride at said grafting temperature (Tg);

a low concentration value of fatty acid chloride in the stream of gaseous composition upstream of said acylation chamber; and a concentration value of hydrochloric acid in the stream of gaseous composition upstream of said acylation chamber, of the order of magnitude of the maximum theoretical concentration value that may be reached as a result of the amount of fatty acid chloride applied to said hydroxylated material;

constitute an indication of optimum reaction conditions.

In a process according to the invention, at least one of the abovementioned parameters is adjusted so that the concentration of the fatty acid chloride in the gaseous atmosphere of said acylation chamber is such that the partial pressure of fatty acid chloride in gaseous form is substantially equal to the saturating vapour pressure at said grafting temperature (Tg).

In the acylation process and device according to the invention, said acylation chamber is a confined chamber. It limits a space under a gaseous atmosphere in which the fatty acid chloride in gaseous form may be present, at least in a close environment of said hydroxylated material, with a partial pressure substantially equal to the saturating vapour pressure of the fatty acid chloride at said grafting temperature (Tg), via which the acylation reaction is favoured.

Preferably, the gaseous atmosphere of said acylation chamber is heated by heating means without contact of a heating surface with said hydroxylated material. However, there is nothing to prevent these heating means from being envisaged to comprise additional means for heating by contact of a heating surface of the heating means with said hydroxylated material.

In certain advantageous embodiments, said scrolled acylated material is subjected to recycling of the excess fatty acid chloride, in which:

said scrolled acylated material passes through a chamber, known as the recycling chamber, lying downstream of said acylation chamber and delimiting an internal space under a gaseous atmosphere;

the gaseous atmosphere of said recycling chamber being brought to a temperature, known as the extraction temperature (Te), above said grafting temperature (Tg) and below the vaporization temperature of the fatty acid chloride, notably between 180° C. and 240° C., in particular about 200° C.;

the stream of gaseous composition flows in said recycling chamber counter-currentwise relative to the scrolling of said acylated material and then in said acylation chamber such that excess fatty acid chloride entrained by said acylated material into said recycling chamber and vaporized as a result of said extraction temperature (Te) is recycled in gaseous form into said acylation chamber and condenses in said acylation chamber as a result of the temperature reduction.

In a process according to the invention, said acylated material passes through said recycling chamber brought to said extraction temperature (Te) above said grafting temperature (Tg). At least a portion of the fatty acid chloride in liquid form deposited on said acylated material passes into the gaseous form as a result of the entry of said acylated material into said recycling chamber at said grafting temperature (Tg), is entrained by the stream of gaseous composition and recycled into said acylation chamber. The entrainment of the fatty acid chloride into said acylation chamber combined with the temperature decrease in said acylation chamber promotes the condensation of the fatty acid chloride in said acylation chamber. The acylation is favoured.

In certain embodiments, the gaseous atmosphere of said recycling chamber is heated by heating means without contact of a heating surface with said acylated material. That being said, there is nothing to prevent the means for heating the gaseous atmosphere of said recycling chamber from comprising additional means for heating by contact with said acylated material, contributing to the heating of the gaseous atmosphere of said recycling chamber.

In certain embodiments, said scrolled hydroxylated material is subjected to preheating, notably to drying, in a chamber known as the preheating chamber, arranged upstream of said acylation chamber and delimiting an internal space under a gaseous atmosphere, which is suitable for the passage therethrough of said scrolled hydroxylated material;

the gaseous atmosphere of said preheating chamber having an increasing temperature gradient, known as the preheating gradient, lying between an upstream inlet for said hydroxylated material into said preheating chamber and a downstream outlet for said hydroxylated material towards said acylation chamber.

Said preheating gradient may extend from atmospheric temperature, notably between 20° C. and 50° C., at the upstream inlet and up to said grafting temperature (Tg), notably between 150° C. and 220° C. at the downstream outlet of said preheating chamber. Said preheating gradient may be formed in combination:

by heating a central part of said preheating chamber to a temperature, known as the preheating temperature (Ts), between the atmospheric temperature and said grafting temperature (Tg); and by the stream of gaseous composition flowing in said preheating chamber and entering said preheating chamber at said grafting temperature (Tg).

In these embodiments, the stream of gaseous composition flows:

in said preheating chamber counter-currentwise relative to said hydroxylated material; and then in a member for extracting the hydrochloric acid formed as a result of the acylation reaction in said acylation chamber.

Said preheating gradient makes it possible firstly to dry said hydroxylated material flowing in said preheating chamber, the water vapour given off by said hydroxylated material being entrained by the stream of gaseous composition. It allows, secondly, condensation of the fatty acid chloride in gaseous form entrained with the stream of gaseous composition into said preheating chamber due to the fall in temperature from downstream to upstream of said preheating chamber.

In certain embodiments, the gaseous atmosphere of said preheating chamber is heated by heating means without contact of a heating surface with said hydroxylated material. However, in other embodiments, there is nothing to prevent the heating means from being envisaged to comprise additional heating means, notably a heating roll, having a surface for heating by contact with said hydroxylated material. Such heating means are chosen to bring said hydroxylated material to a temperature that is as close as possible to said grafting temperature (Tg) at the downstream outlet of said preheating chamber.

In certain embodiments, the gaseous atmosphere of said preheating chamber is subjected to blending suitable for promoting heat exchanges between the gaseous atmosphere of said preheating chamber and said hydroxylated material and condensation of fatty acid chloride on said hydroxylated material. Said preheating chamber may be compartmentalized, each compartment being equipped with a member for blending the gaseous atmosphere of that compartment.

In certain advantageous embodiments of a process according to the invention, said hydroxylated/acylated material is scrolled through a compartmentalized chamber, between an upstream inlet and a downstream outlet of said compartmentalized chamber, in which:

a first compartment of said compartmentalized chamber is formed by said preheating chamber lying in the upstream part of said compartmentalized chamber;

a second compartment of said compartmentalized chamber is formed by said recycling chamber lying in the downstream part of said compartmentalized chamber; and a third compartment of said compartmentalized chamber is formed by said acylation chamber positioned between said preheating chamber and said recycling chamber;

so that said hydroxylated/acylated material passes through said preheating chamber, said acylation chamber and said recycling chamber from upstream to downstream.

In certain embodiments of a process according to the invention, at least one from among the hydrochloric acid and the fatty acid chloride is analysed and assayed in the stream of gaseous composition and at least one process parameter is adjusted as a function of a result of this assay, the adjusted parameter being chosen from the following parameters:

the amount of fatty acid chloride applied per unit area of said hydroxylated material;

the scrolling speed of the hydroxylated material through said acylation chamber;

the stream of gaseous composition;

the temperature of the stream of gaseous composition;

said grafting temperature (Tg);

said preheating gradient;

said recycling temperature (Tr);

the length of travel of said hydroxylated material through said preheating chamber;

the length of travel of said hydroxylated/acylated material through said acylation chamber; and the length of travel of said acylated material through said recycling chamber.

In these embodiments, at least one of the parameters mentioned above is adjusted so as to maximize the concentration of hydrochloric acid in the stream of gaseous composition at the upstream outlet of said compartmentalized chamber. Such a stream of gaseous composition rich in hydrochloric acid constitutes an indicator of the correct progress of the acylation reaction. At least one of the parameters mentioned above is adjusted so as to minimize the concentration of fatty acid chloride in the stream of gaseous composition at the upstream outlet of said compartmentalized chamber. At least one of the parameters mentioned above is adjusted so as to optimize the concentration of fatty acid chloride in the stream of gaseous composition in said acylation chamber.

The invention also relates to a device, known as an acylation reactor, for the acylation of a solid "hydroxylated" material, bearing hydroxyl groups (—OH), known as reaction-generating hydroxyls, which are accessible and capable of reacting with a fatty acid chloride in gaseous form, said acylation reactor comprising:

means for scrolling said hydroxylated material between a reel of said hydroxylated material lying in the upstream part of said acylation reactor and a member for collecting an acylated material lying in the downstream part of said acylation reactor;

a chamber, known as the acylation chamber;

which is suitable for the passage therethrough of said hydroxylated material scrolled between an upstream inlet and a downstream outlet of said acylation chamber;

delimiting a space under a gaseous atmosphere; and equipped with means for heating and maintaining this gaseous atmosphere at a temperature, known as the grafting temperature (Tg), below the vaporization temperature of the fatty acid chloride—notably between 150° C. and 220° C., in particular about 180° C.—and capable of allowing acylation of said hydroxylated material passing through said acylation chamber;

a device for applying, notably continuously, a fatty acid chloride in liquid form to the surface of said scrolled hydroxylated material, the applicator device lying upstream of said acylation chamber; and means for establishing a stream of gaseous composition which are adapted so that the stream of gaseous composition passes through said acylation chamber from downstream to upstream of said acylation chamber and counter-currentwise relative to the scrolling of said hydroxylated material;

characterized in that it comprises means for adjusting the stream of gaseous composition which are suitable for maintaining in the gaseous atmosphere of said acylation chamber a concentration of fatty acid chloride (in gaseous form or in liquid aerosol form dispersed in the gaseous atmosphere) such that fatty acid chloride in gaseous form is present in the gaseous atmosphere of said acylation chamber with a partial pressure substantially equal to the saturating vapour pressure of the fatty acid chloride at said grafting temperature (Tg).

The invention also relates to a device, known as an acylation reactor, for the acylation of a solid "hydroxylated" material, bearing hydroxyl groups (—OH), known as reaction-generating hydroxyls, which are accessible and capable of reacting with a fatty acid chloride in gaseous form, for performing a process according to the invention.

The advantages described above in relation with the process for acylating said hydroxylated material also apply to said acylation reactor.

In certain embodiments, said acylation reactor according to the invention comprises a chamber, known as the recycling chamber, different from said acylation chamber, arranged downstream of said acylation chamber, delimiting a space under a gaseous atmosphere and suitable for the passage therethrough of said acylated material scrolling between an upstream inlet and a downstream outlet of said recycling chamber (relative to the direction of scrolling of said hydroxylated/acylated material), said acylation chamber and said recycling chamber being in communication with gaseous composition so that the stream of gaseous composition passing through said acylation chamber from downstream to upstream of said acylation reactor first passes through said recycling chamber and then said acylation chamber and counter-currentwise relative to the scrolling of said acylated material; said recycling chamber comprising means for heating the gaseous atmosphere of said recycling chamber to a temperature, known as the extraction temperature (Te), above said grafting temperature (Tg) and below the vaporization temperature of the fatty acid chloride at atmospheric pressure, notably to a temperature of between 180° C. and 240° C., in particular about 200° C.

In certain advantageous embodiments, said acylation reactor according to the invention comprises a chamber, known as the preheating chamber, different from said acylation chamber and from said recycling chamber, arranged upstream of said acylation chamber, which is suitable for the passage therethrough of said hydroxylated material scrolling between an upstream inlet and a downstream outlet of said preheating chamber and delimiting an internal space under a gaseous atmosphere; said preheating chamber being equipped with means for heating the gaseous atmosphere of said preheating chamber along an increasing temperature gradient, known as the preheating gradient, lying between an upstream inlet for said hydroxylated material into said preheating chamber and a downstream outlet for said hydroxylated material out of said preheating chamber.

In certain embodiments, said acylation reactor is formed from a compartmentalized chamber through which longitudinally passes said hydroxylated/acylated material scrolled between an inlet and an outlet of said compartmentalized chamber, a first compartment of said compartmentalized chamber being formed by said preheating chamber lying in the upstream part of the compartmentalized chamber, a second compartment of said compartmentalized chamber being formed by said recycling chamber lying in the downstream part of said compartmentalized chamber and a third compartment of said compartmentalized chamber being formed by said acylation chamber lying in the intermediate part of the compartmentalized chamber, positioned between said preheating chamber and said recycling chamber.

Said acylation reactor is advantageously compact. It is simple in its design, each of the three acylation, preheating and recycling chambers being passed through by the scrolled hydroxylated/acylated material thus placed successively in contact with the gaseous atmosphere of said preheating chamber along said preheating gradient, and then in contact with the gaseous atmosphere of said acylation chamber at said grafting temperature (Tg), and then in contact with the gaseous atmosphere of said recycling chamber at said recycling temperature (Tr). Moreover, the stream of gaseous composition passes successively through said recycling chamber (in which it becomes charged with fatty acid chloride, essentially in gaseous form), and then said acylation chamber (in which it becomes freed of fatty acid chloride due to the fall in temperature and as a result of the acylation reaction and becomes charged with hydrochloric acid as a result of the acylation reaction) and then said preheating chamber. It thus suffices to provide through apertures, for said hydroxylated/acylated material and for the stream of gaseous composition, made in the walls separating said acylation chamber and said recycling chamber, on the one hand, and separating said acylation chamber and said preheating chamber, on the other hand.

The heating means of said compartmentalized chamber, notably the heating means of said acylation chamber, of said preheating chamber and of said recycling chamber, may be of any type. In certain embodiments, these heating means are means for the remote heating of said scrolled hydroxylated/acylated material and without contact with said hydroxylated/acylated material, which are suitable for heating and maintaining:

the gaseous atmosphere of said acylation chamber at said grafting temperature (Tg);

the gaseous atmosphere of said recycling chamber at said extraction temperature (Te); and the gaseous atmosphere of said preheating chamber on said preheating gradient.

In certain embodiments, the heating means may comprise at least one heat exchanger, at least one heating surface of which is in contact with said gaseous atmosphere. In particular, in certain embodiments, said heat exchanger forms an outer wall of said acylation chamber, of said preheating chamber and/or of said recycling chamber. However, there is nothing to prevent these heating means from comprising additional means for heating by contact of a heating surface of the heating means with said hydroxylated material.

Said acylation reactor according to the invention is equipped with an analytical device suitable for analysing and quantifying the chemical species, notably the fatty acid chloride and the hydrochloric acid, present in the stream of gaseous composition, notably in the stream of gaseous composition flowing in said acylation chamber, in said recycling chamber or in said preheating chamber, and/or at the upstream outlet of said acylation chamber or of said preheating chamber or of said compartmentalized chamber. The analytical device is capable of producing quantification data representative of the concentration of fatty acid chloride and of the concentration of hydrochloric acid in the stream of gaseous composition. The analytical device is capable of producing quantification data representative of the concentration of fatty acid chloride and of the concentration of hydrochloric acid in the gaseous atmosphere of said acylation chamber. Such an analytical device allows monitoring (or chemical monitoring), notably continuous and real-time monitoring, of the concentration of fatty acid chloride and of the concentration of hydrochloric acid in any part of said acylation reactor.

Such an analytical device also allows adjustment, notably real-time adjustment, of adjustable parameters of the acylation reaction, for instance said grafting temperature (Tg), said preheating temperature (Ts) gradient, said recycling temperature (Tr), the scrolling speed of the hydroxylated material, the residence time of said hydroxylated material in said acylation chamber, the area density of said fatty acid chloride applied to said hydroxylated material, and the stream of the gaseous composition, notably.

In certain embodiments, said acylation reactor comprises computer means configured to receive the quantification data and to control, using these quantification data, at least one, notably each, of the members of said acylation reactor, chosen from the group formed by:

means for scrolling said hydroxylated material;

the device for applying the fatty acid chloride to the surface of said hydroxylated material;

means for heating the gaseous atmosphere of said acylation chamber to said grafting temperature (Tg);

means for heating the gaseous atmosphere of said recycling chamber to said recycling temperature (Tr);

means for heating the gaseous atmosphere of said preheating chamber on said preheating gradient;

means for establishing the stream of gaseous composition; and means for controlling the temperature of the gaseous composition.

In certain embodiments, said acylation chamber is equipped with means for forming in said acylation chamber a stream, known as the cross stream, of gaseous composition in a flow direction substantially parallel to the plane of the hydroxylated/acylated material and substantially orthogonal to the scrolling direction of the hydroxylated/acylated material. Such means are suitable for acylating a hydroxylated material formed from corrugated cardboard. In this embodiment, the flow direction of said cross stream is substantially parallel to the corrugations of the corrugated cardboard so that said cross stream flows and passes longitudinally through the holes formed by the corrugations of the corrugated cardboard.

In certain embodiments, said acylation reactor is equipped with a member for retaining the hydrochloric acid entrained with the stream of gaseous composition and for releasing a stream of gaseous composition substantially free of hydrochloric acid. Any hydrochloric acid retaining/trapping member is possible. It may be a trap containing an aqueous solution of at least one basic compound through which the stream of gaseous composition is sparged. Advantageously, the stream of gaseous composition discharged outside said acylation reactor is substantially free of hydrochloric acid.

In certain embodiments of an acylation reactor according to the invention, at least one from among said preheating chamber, said acylation chamber and said recycling chamber is equipped with a plurality of rolls for guiding the scrolled hydroxylated/acylated material, which are positioned so as to guide the scrolled hydroxylated/acylated material along a non-linear path.

In certain advantageous embodiments of an acylation reactor according to the invention, the device for applying the fatty acid chloride in liquid form to the surface of said hydroxylated material comprises a device for spreading the fatty acid chloride on the surface of said hydroxylated material, the spreading device being a rotating spreading device having an application surface formed from a velvet provided with velvet filiform elements, which are unreactive towards the fatty acid chloride and are capable of:

taking up fatty acid chloride by contact with said at least one fatty acid chloride; and releasing fatty acid chloride on contact of said hydroxylated material, by contact of the velvet filiform elements with said hydroxylated material. In certain embodiments, the spreading device is of the "lacquer roll" type.

The spreading device makes it possible to uniformly, reproducibly and homogeneously spread a small amount of fatty acid chloride on the surface of said hydroxylated material, this small amount being, however, sufficient to give the acylated material hydrophobicity, leaktightness to aqueous liquids and water repellency that are at least equal to, or even generally greater than, the hydrophobicity, leaktightness and water repellency of an acylated material obtained via a process prior to the invention.

The invention also relates to a process and a device for the acylation of a solid material bearing hydroxyl groups (—OH), known as reaction-generating hydroxyls, which are accessible and capable of reacting with a fatty acid chloride in gaseous form, characterized in combination by all or some of the characteristics mentioned hereinabove or hereinbelow. Irrespective of the formal presentation that is given thereof, unless explicitly indicated otherwise, the various characteristics mentioned hereinabove or hereinbelow should not be considered as being strictly or inextricably linked together, the invention being able to concern only one of these structural or functional characteristics, or only a portion of these structural or functional characteristics, or only a portion of one of these structural or functional characteristics, or else any group, combination or juxtaposition of all or a portion of these structural or functional characteristics.

These and other objects, advantages and features of the invention will become apparent upon review of the following specification in conjunction with the drawings.

BRIEF DESCRIPTION OF THE DRAWINGS

Other aims, characteristics and advantages of the invention will emerge on reading the non-limiting illustrative examples of certain embodiments of the invention and of the description below, which refers to the attached figures in which:

In FIGS. 1, 2 and 3, the dimensions and proportions of the elements of the acylation reactor are not to scale. In particular, the length of the acylation reactor extending in the scrolling direction of the hydroxylated material is reduced relative to the cross section of the acylation reactor for the sake of clarity.

DESCRIPTION OF THE PREFERRED EMBODIMENTS

Figure 1:
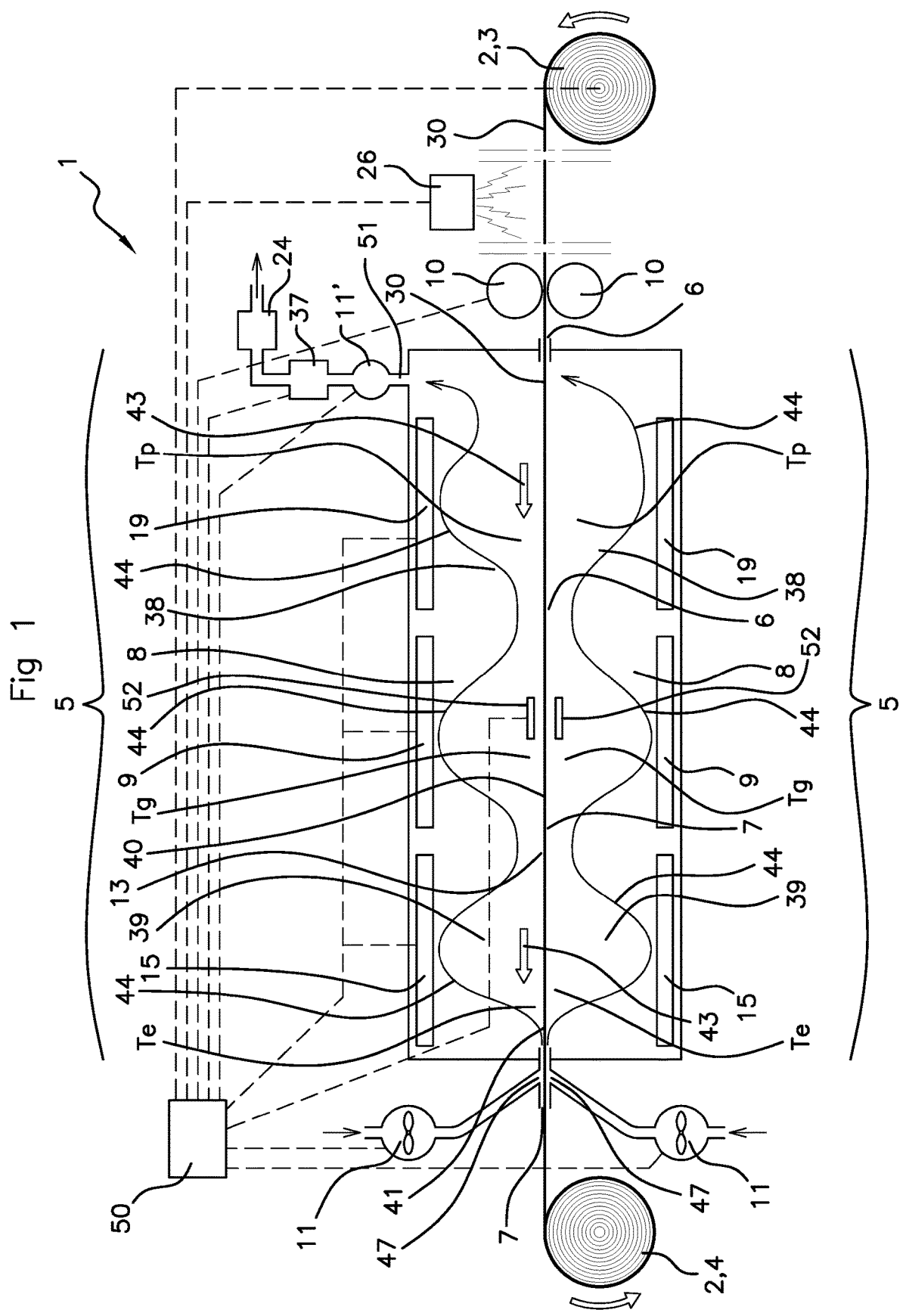
FIG. 1 is a schematic representation in cross section of a first particular embodiment of an acylation reactor according to the invention.

The inventor has determined that:
vaporization of the fatty acid chloride is necessary for the acylation reaction;
placing a hydroxylated material in a closed chamber saturated with fatty acid chloride in gaseous form at the grafting temperature (i.e. in the absence of a stream of gaseous composition) leads only to slow acylation of the hydroxylated material, which is incompatible with treatment of a scrolled hydroxylated material;
the application of an intense air stream onto a hydroxylated material supporting fatty acid chloride in liquid form, which is capable of entraining fatty acid chloride in gaseous form, allows only low acylation of the hydroxylated material and leads to substantial loss of fatty acid chloride in gaseous form.

The inventor has discovered that, to promote the acylation reaction, the approach to follow is 1) to apply fatty acid chloride in liquid form to the surface of the hydroxylated material, 2) to adjust the reaction temperature to said grafting temperature (Tg) and 3) to apply an air stream that is just sufficient to entrain the hydrochloric acid formed as a result of the reaction, but also low enough to maintain fatty acid chloride under saturating conditions in the gaseous atmosphere of said acylation chamber. According to the inventor, the chromatogenic acylation reaction proceeds from a particular physical state of the fatty acid chloride, referred to as the "transition state", accompanying the vaporization and/or condensation of the fatty acid chloride, and that the changes in state (vaporization/condensation) of the fatty acid chloride are favourable to its reactivity. The reason for this is that if the concentration of fatty acid chloride is less than the concentration corresponding to the saturating vapour pressure of the fatty acid chloride at said grafting temperature (Tg), the liquid fatty acid chloride evaporates, passes into the gaseous atmosphere and the stream of gaseous composition does not recondense on said hydroxylated/acylated material. If the concentration of fatty acid chloride is at least equal to the concentration corresponding to the saturating vapour pressure, the gaseous fatty acid chloride recondenses before being entrained in the stream of gaseous composition. The inventor considers that while the air stream (or "air knife") formed in the device of WO 2012/066015 makes it possible to entrain the hydrochloric acid, it does not, on the other hand, make it possible to maintain, on contact of said hydroxylated material, a gaseous atmosphere with a sufficient concentration of fatty acid chloride, notably of fatty acid chloride in this "transition state".

The air knife entraining the hydrochloric acid of WO 2012/066015 does not promote optimum acylation conditions. The process and the device of WO 2012/066015 do not make it possible to produce an acylated material having a hydrophobicity comparable to that of an acylated material obtained via a non-industrial process by impregnation of a hydroxylated material with a solution of fatty acid chloride in an organic solvent, notably in pentane. By comparing the hydrophobicity of an acylated material obtained according to WO 2012/066015 and the hydrophobicity of an acylated material obtained via the non-industrial process—by measuring the Cobb index, by measuring the contact angle formed by a drop of water deposited on the surface of the acylated substrate and by the test of leaktightness of a water pocket formed from such an acylated substrate—it was observed that the hydrophobicity of the acylated material obtained via the process of WO 2012/066015 is lower than the hydrophobicity of the acylated material obtained via the non-industrial process and that the process and the device of WO 2012/066015 do not promote the acylation reaction. In addition, the process of WO 2012/066015 only makes it possible to obtain a material which is imperfectly acylated, and only at the cost of depositing an excess of fatty acid chloride, which excess needs to be removed from the material at the end of the process.

Thus, it was determined that the acylation conditions must be adjusted with regard to the fatty acid chloride applied to said hydroxylated material. By way of example, the saturating vapour pressure of palmitic acid chloride ($CH_3$-$(CH_2)$ 14-CO—Cl) is of the order of 107 g/m3 at a temperature of 160° C. and of the order of 205 g/m3 at a temperature of 180° C. The saturating vapour pressure of stearic acid chloride ($CH_3$-$(CH_2)$ 16-CO—Cl) is of the order of 59 g/m3 at a temperature of 160° C. and of the order of 117 g/m3 at a temperature of 180° C. The temperature in said acylation chamber should thus be adjusted so as to maximize the concentration of the fatty acid chloride and the partial pressure of the fatty acid chloride in gaseous form in the gaseous atmosphere of said acylation chamber. The stream of gaseous composition should also be adjusted with regard to this temperature.

In a process according to the invention, the concentration of hydrochloric acid in the stream of gaseous composition at the outlet of said acylation chamber, the concentration of fatty acid chloride in the stream of gaseous composition at the outlet of said acylation chamber and the concentration of fatty acid chloride in the gaseous atmosphere of said acylation chamber are notably measured and the grafting temperature (Tg) in said acylation chamber and/or the amount of fatty acid chloride applied per unit area of said hydroxylated material and/or the scrolling speed of the hydroxylated material and/or the residence time of said hydroxylated material in said acylation chamber, in said preheating chamber and/or in said recycling chamber and/or the stream of gaseous composition are adjusted, according to the result of these measurements.

A low concentration of hydrochloric acid in the stream of gaseous composition upstream of said acylation chamber indicates poor acylation efficiency. It may reveal either a fault in the application of the fatty acid chloride to said hydroxylated material or an excessively low temperature value in said acylation chamber. A high concentration of hydrochloric acid in the stream of gaseous composition upstream of said acylation chamber and of the order of magnitude of the maximum theoretical partial pressure value that may be reached as a result of the amount of fatty acid chloride deposited is indicative either of optimum reaction conditions or of an excessively high humidity of the hydroxylated material leading to hydrolysis of the fatty acid chloride, which is penalizing for the acylation reaction.

A low concentration of fatty acid chloride in the stream of gaseous composition upstream of said acylation chamber constitutes an indication of a fault in the application of the fatty acid chloride, either of optimum reaction conditions, or of an excessively low temperature in said acylation chamber not allowing the acylation reaction. Combined with a significant concentration of hydrochloric acid, such a low concentration of fatty acid chloride is indicative of optimum reaction conditions.

A high concentration of fatty acid chloride in the stream of gaseous composition upstream of said acylation chamber may indicate either excessive deposition of fatty acid chloride upstream, or non-optimal reaction conditions, notably an excessively high stream of gaseous composition and/or an excessively high temperature in said acylation chamber. Measurement of the concentration of the fatty acid chloride in said acylation chamber makes it possible to assert optimum reaction conditions, i.e. at saturating vapour pressure, but without excess.

A high concentration of fatty acid chloride in said acylation chamber is indicative either of excessive application of fatty acid chloride upstream, or of non-optimum reaction conditions which leave a large amount of fatty acid chloride remaining on the surface of said acylated material, or of an excessively low stream of gaseous composition.

An excessively high concentration of hydrochloric acid relative to the stoichiometric amounts of the acylation reaction may indicate a side reaction of degradation of the fatty acid chloride by the water contained in the hydroxylated material.

A first variant of a device, known as acylation reactor 1, for the acylation of a solid material, referred to as the hydroxylated material 30, bearing hydroxyl groups (—OH), known as reaction-generating hydroxyls, which are accessible and capable of reacting with at least one fatty acid chloride in gaseous form is shown in FIG. 1. Said acylation reactor 1 comprises means 2 for scrolling said hydroxylated material 30 between a reel 3 lying in the upstream part of said acylation reactor 1 and a member 4 for collecting an acylated material lying in the downstream part of said acylation reactor 1. The scrolling direction of said hydroxylated/acylated material 30, 40, 41 in said acylation reactor is indicated by the arrows 43. The scrolling means 2 are suitable for enabling scrolling of said hydroxylated material 30, 40, 41 at an adjustable scrolling speed, notably greater than 30 m/minute, preferably greater than 100 m/minute. The upstream reel 3 may be a reel of hydroxylated material conditioned in the form of a roll or coil and the collection member 4 may be a member for rolling up and rewinding the acylated material 41. Any other form of reel 3 is possible, for example a reel 3 of hydroxylated material conditioned in the form of a succession of folded sheets.

Said acylation reactor 1 shown in FIG. 1 comprises a chamber, known as the acylation chamber 5, delimiting an internal space under a gaseous atmosphere and having an upstream inlet 6 for said hydroxylated material 30 into said acylation chamber 5 and a downstream outlet 7 for acylated material 41 ready to be conditioned on the collection member 4. The upstream inlet 6 and the downstream outlet 7 each form an aperture, notably a slit, in said acylation chamber 5 lying transversely relative to the scrolling of the hydroxylated material. The size of the upstream inlet aperture and of the downstream outlet aperture are chosen so as not to hamper the scrolling of the hydroxylated material and are small enough to allow controlled confinement of the gaseous atmosphere in said acylation chamber 5. Said acylation chamber 5 forms an internal space 38, 8, 39 under a gaseous atmosphere, which is suitable for the passage therethrough longitudinally of said hydroxylated/acylated material 30, 40, 41 scrolled from upstream to downstream in the scrolling direction 43. Said acylation chamber 5 has means 19, 9, 15 for heating the gaseous atmosphere of said acylation chamber 5. The heating means 19, 9, 15 are suitable for allowing the gaseous atmosphere of at least one zone, notably a central zone 8, of said acylation chamber 5 to be brought to a temperature, known as the grafting temperature (Tg), below the vaporization temperature of the fatty acid chloride and sufficient to allow acylation of said hydroxylated material 30 passing through said acylation chamber 5. The heating means 19, 9, 15 may be of any type. They may be heat exchangers 19, 9, 15 that are suitable for heating the gaseous atmosphere by conduction. However, there is nothing to prevent the heating means 19, 9, 15 from being inductive or radiative heating means. In a particular embodiment, the heat exchangers 19, 9, 15 are suitable for heating the atmosphere of said acylation chamber 5 on a thermal gradient via which the temperature increases from upstream to downstream in said acylation chamber 5, at least a central part of said acylation chamber 5 being maintained at said grafting temperature (Tg). The chromatogenic acylation reaction is thus optimized.

Said acylation reactor 1 shown in FIG. 1 comprises means for introducing a stream of gaseous composition into the downstream part of said acylation chamber 5. They make it possible to establish a stream of gaseous composition, notably a stream of atmospheric air, passing through said acylation chamber 5 from downstream to upstream and counter-currentwise relative to the scrolling direction 43 of said hydroxylated/acylated material 30, 40, 41. In certain embodiments, the means 11 for introducing the air stream comprise a turbine configured to take in atmospheric air and to form the air stream entering said acylation chamber 5 via a downstream inlet 47 for the air stream and exiting from said acylation chamber 5 via an upstream outlet 51. In certain embodiments, the downstream inlet 47 for the air stream coincides with the outlet slit 7 for the acylated material so that the air stream 36 entering said acylation chamber 5 via the outlet slit 7 for the hydroxylated material counteracts, notably totally prevents, the leakage of the gaseous atmosphere from said acylation chamber 5 via the slit 7. The means 11 for introducing the stream of gaseous composition comprise means for adjusting this stream. They may also comprise means for heating this air stream prior to its introduction into said acylation chamber 5. The downstream inlet 47 for the air stream into said acylation chamber 5 forms a slit lying transversely over the entire width of said acylation chamber 5 and over the entire width of the acylated material width. It allows the formation of an air knife for spreading the air stream over the entire width of said acylation chamber 5. There is nothing to prevent the means 11 for introducing the air stream into the downstream part of said acylation chamber 5 from comprising a pump 11' for sucking up the gaseous atmosphere of said acylation chamber 5, emerging at the upstream outlet 51 for the air stream of said acylation chamber 5.

In the acylation reactor 1 shown in FIG. 1 and during the implementation of the process according to the invention, the air stream flowing counter-currentwise in said acylation chamber 5 forms an air knife, the flow rate of which is adjusted so as to be sufficient to allow entrainment of the hydrochloric acid formed as a result of the acylation reaction, and so as to be low enough to maintain, in the gaseous atmosphere of said acylation chamber 5, a concentration of fatty acid chloride that is sufficient to allow the reaction.

The upstream outlet 51 for the air stream emerges, where appropriate entrained by the suction pump 11', onto a device 37 for analysing this air stream. The analytical device 37 comprises means for analysing and quantifying the chemical species that may be present in this air stream, notably gaseous hydrochloric acid, fatty acid chloride and, where appropriate, water vapour. Said acylation reactor 1 also comprises a device 52 for analysing and quantifying the fatty acid chloride in the air stream exiting said acylation chamber 5, the composition of this exiting air stream being representative of the composition of the gaseous atmosphere of said acylation chamber 5. Such analytical devices 37, 52 make it possible, together with a computer device 50, to control the optimum progress of the acylation reaction and to provide instructions for performing, if necessary, adjustment of at least one control parameter of said acylation reactor 1.

Said acylation reactor 1 also comprises a member 24 for extracting the gaseous hydrochloric acid present in the air stream, located downstream of the analytical device 37 relative to the air stream. The extraction member 24 is suitable for trapping the gaseous hydrochloric acid from the air stream and for releasing into the terrestrial atmosphere an air stream that is substantially free of hydrochloric acid.

Said acylation reactor shown in FIG. 1 comprises a device 10 for applying the fatty acid chloride onto said scrolled hydroxylated material 30. The applicator device 10 is stationary and makes it possible to deposit fatty acid chloride continuously onto the scrolled hydroxylated material 30. The applicator device 10 is chosen to be able to perform a deposition on the two main faces of said hydroxylated material 30 or on only one of its main faces. The applicator device 10 may comprise a printing device, notably a flexographic printing device or a rotogravure printing device. The applicator device 10 may comprise an "anilox" roll whose cell dimensions and surface density are suited to the amount of fatty acid chloride to be deposited. There is nothing to prevent envisaging the deposition of fatty acid chloride onto only one of the two main faces of said hydroxylated material, the other face of said hydroxylated material being masked during the deposition with a rotating ply applied to the opposite face to the deposit and accompanying the scrolling of said hydroxylated material. There is nothing to prevent envisaging coating one of the faces of the hydroxylated material with a coat of a material, notably of starch with high rotational mobility, which is unsuitable for imparting hydrophobicity to that face.

Said acylation reactor 1 shown in FIG. 1 comprises a device 26 for heating said hydroxylated material 30 upstream of the device 10 for applying the fatty acid chloride. This heating device 26 is optional. It is adapted to be able to bring said hydroxylated material 30 to a temperature suitable for enabling the subsequent deposit of the fatty acid chloride and for maintaining it in liquid form during its application to the hydroxylated material. The heating device 26 may be of any type, notably a radiative heating device (for example an infrared heating device) or a heat exchanger.

In one variant, not shown, of an acylation reactor 1 according to the invention, the applicator device may comprise, firstly, an upstream flexographic printing device or a rotogravure printing device for depositing the fatty acid chloride as discontinuous lumps laterally on the surface of the hydroxylated material and, secondly, a downstream member for spreading the fatty acid chloride over the entire surface of said hydroxylated material. Such a spreading member may have a surface for contact with said hydroxylated material formed from a velvet provided with velvet filiform elements. Such a spreading member makes it possible to form a uniform deposit on the surface of said hydroxylated material with a density of fatty acid chloride per square metre of hydroxylated material of between 20 mg/m2 and 1 g/m2. Such a spreading member may be of the "lacquer roll" type and this spreading step is performed at a temperature of between 40° C. and 190° C.

Figure 2:
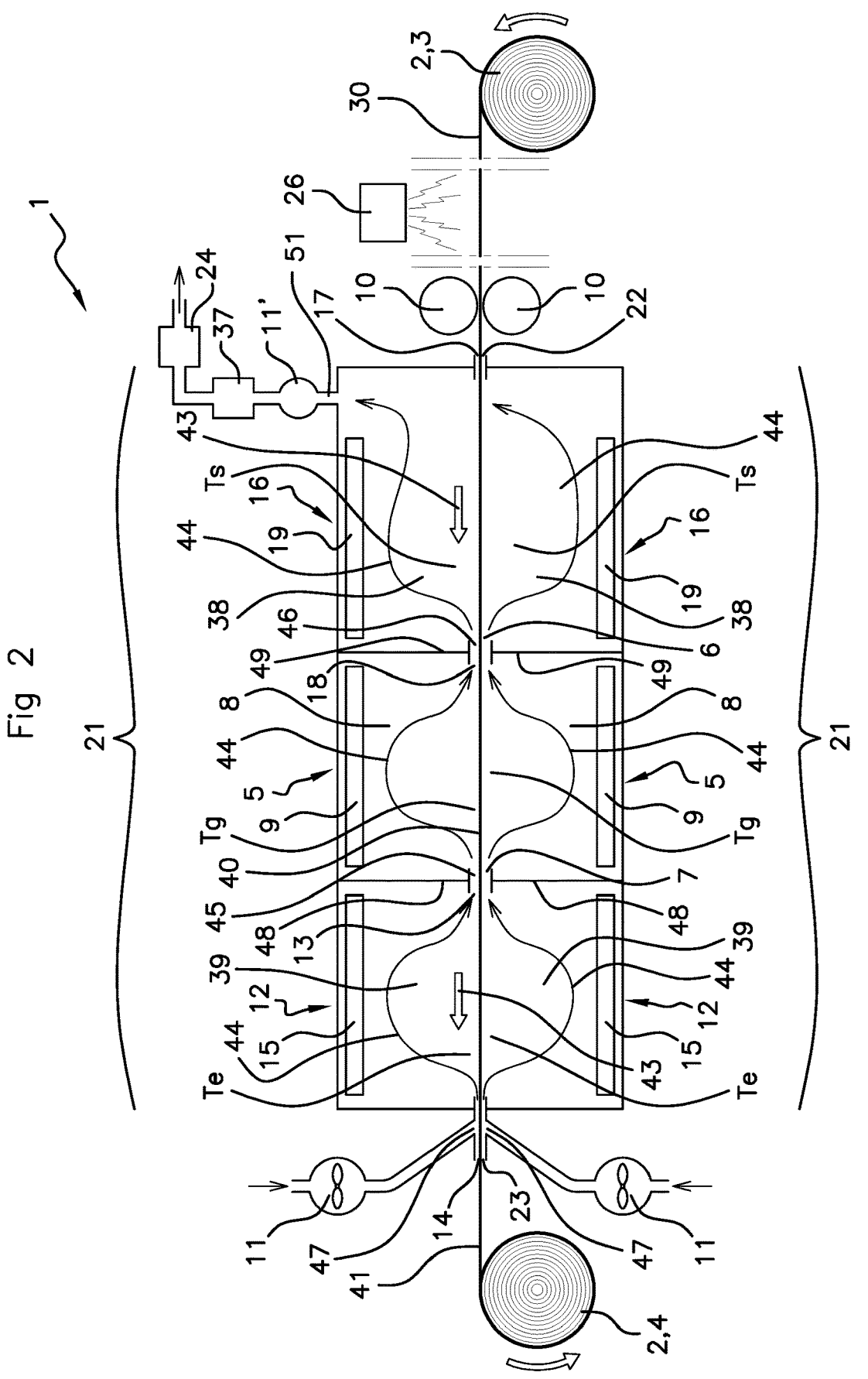
FIG. 2 is a schematic representation in cross section of a second particular embodiment of an acylation reactor according to the invention.

A second variant of an acylation reactor 1 according to the invention is shown in FIG. 2. Said acylation reactor 1 comprises:

means 2 for scrolling said hydroxylated material 30;

a device 10 for applying the fatty acid chloride onto said scrolled hydroxylated material 30;

a device 26 for heating said hydroxylated material 30 upstream of the device 10 for applying the fatty acid chloride(s);

means 11 for introducing a stream of atmospheric air into said compartmentalized chamber 21 and for circulating this air stream from downstream to upstream and counter-currentwise relative to the scrolling direction 43 of said hydroxylated/acylated material 30, 40, 41 in said compartmentalized chamber 21;

a member 24 for extracting the gaseous hydrochloric acid present in the stream of gaseous composition, located downstream of the analytical device 37 relative to the stream of gaseous composition; as described in FIG. 1.

Said acylation reactor 1 shown in FIG. 1 comprises a compartmentalized chamber 21 having an upstream inlet 22 for said hydroxylated material 30 into the compartmentalized chamber 21 and a downstream outlet 23 for acylated material 41 ready to be conditioned in the collection member 4. The upstream inlet 22 and the downstream outlet 23 each form an aperture, notably a slit, in said compartmentalized chamber 21 lying transversely relative to the scrolling of the hydroxylated/acylated material. The size of the upstream inlet aperture 22 and of the downstream outlet aperture 23 are chosen so as not to hamper the scrolling of the hydroxylated material and are small enough to allow controlled confinement of the gaseous atmosphere in said compartmentalized chamber 21. Said compartmentalized chamber 21 is formed from three juxtaposed compartments 16, 5, 12 suitable for the passage therethrough, one after the other, of said hydroxylated/acylated material 30, 40, 41 scrolled from upstream to downstream. It comprises, from upstream to downstream, a first compartment lying in the upstream part of said acylation reactor 1 and forming a chamber, known as the preheating chamber 16, delimiting an internal space 38 under a gaseous atmosphere having an increasing temperature gradient between the inlet 17 and the outlet 18 for said hydroxylated material 30. Said preheating chamber 16 comprises at least one heat exchanger 19, notably a plurality of exchangers, arranged in the internal space 38 of said preheating chamber 16. The heat exchanger(s) 19 are suitable for heating the gaseous atmosphere of said preheating chamber 16 along said preheating gradient. Thus, said hydroxylated material 30 passing through said preheating chamber 16 brought to said preheating temperature (Tp) is at least partially dried. For example, such a temperature gradient may extend from an upstream temperature of the order of the atmospheric temperature, notably of the order of 40° C., to a downstream temperature of the order of the grafting temperature (Tg). Needless to say, this temperature gradient is established taking into account the hot air stream passing through said preheating chamber 16 from downstream to upstream, counter-currentwise relative to the scrolling hydroxylated material 30.

Said compartmentalized chamber 21 comprises a second compartment lying downstream of said preheating chamber 16. This second compartment forms said acylation chamber 5, delimiting an internal space 8 under a gaseous atmosphere which may be heated to said grafting temperature (Tg), below the vaporization temperature of each fatty acid chloride-notably between 150° C. and 220° C., in particular about 180° C.—and capable of allowing acylation of said hydroxylated material 30 passing through said acylation chamber 5. Said acylation chamber 5 comprises at least one heat exchanger 9, arranged in the internal space 8 of said acylation chamber 5. The heat exchanger 9 is suitable for heating, notably by convection, the gaseous atmosphere of said acylation chamber 5 to said grafting temperature (Tg).

Said compartmentalized chamber 21 also comprises a third compartment lying downstream of said acylation chamber 5 and in the downstream part of said compartmentalized chamber 21. This third compartment forms a chamber, known as the recycling chamber 12, delimiting an internal space 39 under a gaseous atmosphere which may be heated to a temperature, known as the recycling temperature (Tr), below the vaporization temperature of the fatty acid chloride and above said grafting temperature (Tg), notably to a temperature of between 180° C. and 240° C., in particular about 200° C. Said recycling temperature (Tr) is chosen so as to promote the liquid/gas conversion of the fatty acid chloride in said recycling chamber 12.

In said acylation reactor 1 shown in FIG. 2, during the implementation of the process according to the invention, the atmospheric air stream flowing from downstream to upstream in said compartmentalized chamber 21 makes it possible to entrain the gaseous atmosphere of said recycling chamber 12 (and fatty acid chloride in gaseous form) into said acylation chamber 5. The fall in temperature between the two chambers leads to condensation of a portion of the gaseous fatty acid chloride in said acylation chamber 5. The provision of fatty acid chloride to said acylation chamber 5 modifies the liquid/gas equilibrium of the fatty acid chloride in said acylation chamber 5 and promotes the transition state of the fatty acid chloride and the acylation reaction. The air stream also allows entrainment of the gaseous atmosphere of said acylation chamber 5 into said preheating chamber 16, such that the reduction in temperature between the two acylation and preheating chambers 5, 16 brings about condensation of the fatty acid chloride in said preheating chamber 16 and its recycling into said acylation chamber 5 due to the scrolling of said hydroxylated material 30.

Said compartmentalized chamber 21 comprises a first separating partition 48 lying between said recycling chamber 12 and said acylation chamber 5. This separating partition 48 has an aperture 13 for the entry of said acylated material 40 into said recycling chamber 12 and an aperture 7 for the exit of said acylated material 40 from said acylation chamber 5. The first separating partition 48 also has an aperture 45 for the exit of the stream of gaseous composition coinciding with the slit 7 for the exit of said acylated material 40 from said acylation chamber 5. This air outlet aperture 45 allows control of the stream of gaseous composition flowing from said recycling chamber 12 to said acylation chamber 5. Said compartmentalized chamber 21 comprises a second separating partition 49 lying between said acylation chamber 5 and said preheating chamber 16. This separating partition 49 has an aperture 6 for the entry of said hydroxylated material 40 into said acylation chamber 5 and an aperture 18 for the exit of said hydroxylated material 30 from said preheating chamber 16. The separating partition 49 also has an aperture 46 for the exit of air coinciding with the slit 6 for the entry of said acylated material 40 into said acylation chamber. This aperture 46 allows controlled passage of the stream of gaseous composition flowing from said acylation chamber 5 to said preheating chamber 16.

Said acylation reactor 1 shown in FIG. 2 comprises in its upstream part, in particular in the upstream part of said preheating chamber 16, an outlet 51 for the atmospheric air stream, emerging in a device 37 for analysing this air stream, as described in FIG. 1. The analytical device 37 comprises means for analysing and quantifying the chemical species that may be present in the stream of gaseous composition, notably water vapour, gaseous hydrochloric acid and fatty acid chloride. Such an analytical device 37 makes it possible to determine whether the progress of the acylation reaction is optimal and/or whether an adjustment of at least one parameter of said acylation reactor 1 needs to be made. Purely by way of example, a high content of water vapour in the gaseous composition exiting said preheating chamber 16 is indicative of hydroxylated material 30 having a high humidity content and an increase in the temperature of said preheating chamber 16 needs to be envisaged. Also, a low concentration of gaseous hydrochloric acid in the gaseous composition at the upstream outlet 51 of said preheating chamber 16 is indicative of non-optimal and/or incomplete progress of said acylation reaction. The way to proceed is to make an adjustment of the scrolling speed of said hydroxylated material and/or of the air stream and/or of said grafting temperature (Tg), for example, so that the concentration of gaseous hydrochloric acid in the stream of gaseous composition is maximal. A high concentration of fatty acid chloride in the air stream may be indicative, on the one hand, of partial acylation and, on the other hand, of a risk of excess fatty acid chloride remaining on said acylated material and affecting the hydrophobicity properties thereof. In any case, such analyses make it possible to objectively adjust the control parameters of said acylation reactor 1. Such analyses may be performed by means of one or more analytical devices which are known per se, for example by means of a flame ionization detector and/or a mass spectrometer. Such adjustments may be made automatically by computer means 50 for controlling said acylation reactor 1.

Figure 3:
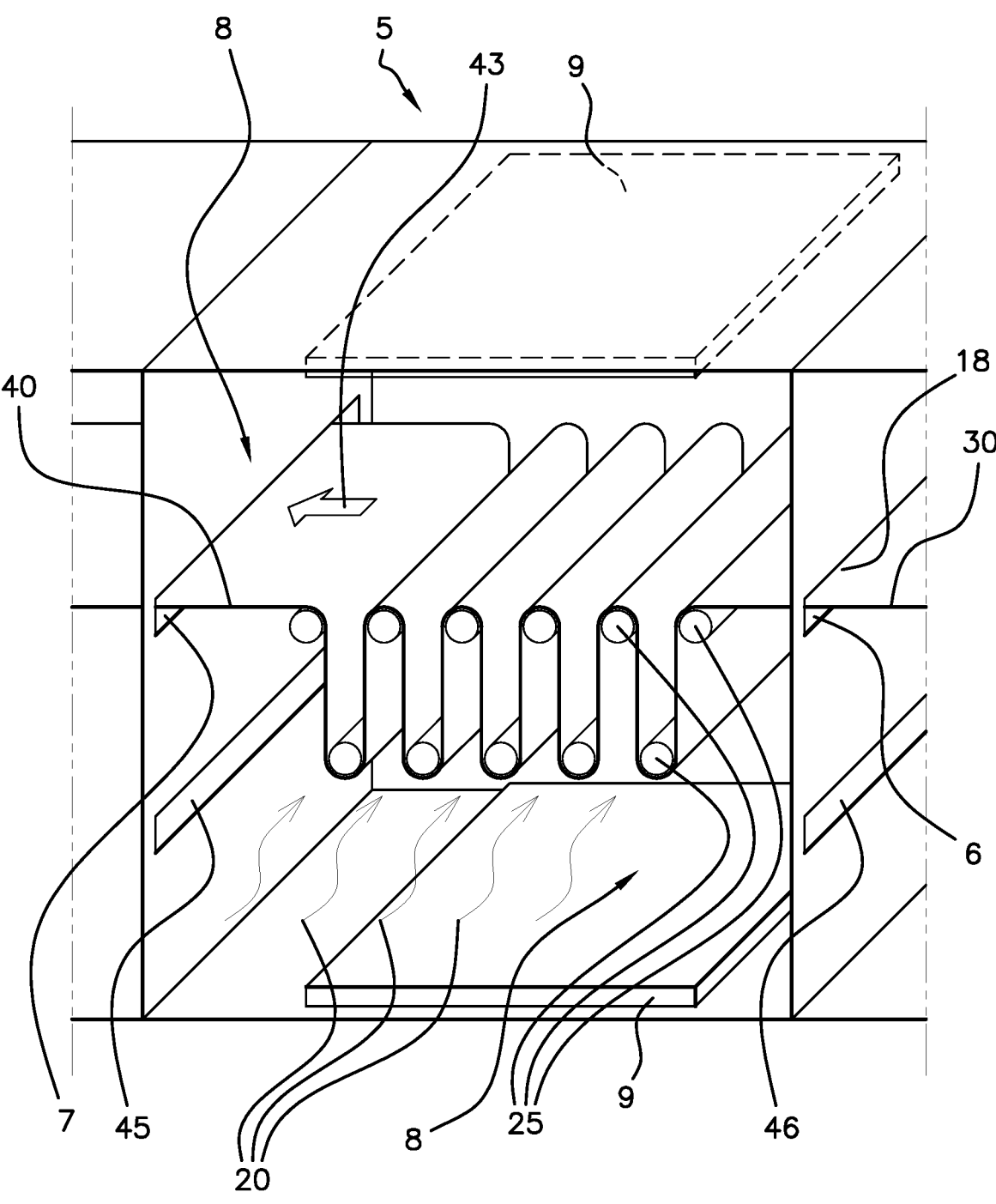
FIG. 3 is a schematic representation in perspective of one particular embodiment of an acylation chamber of an acylation reactor according to the invention.
Figure 4:
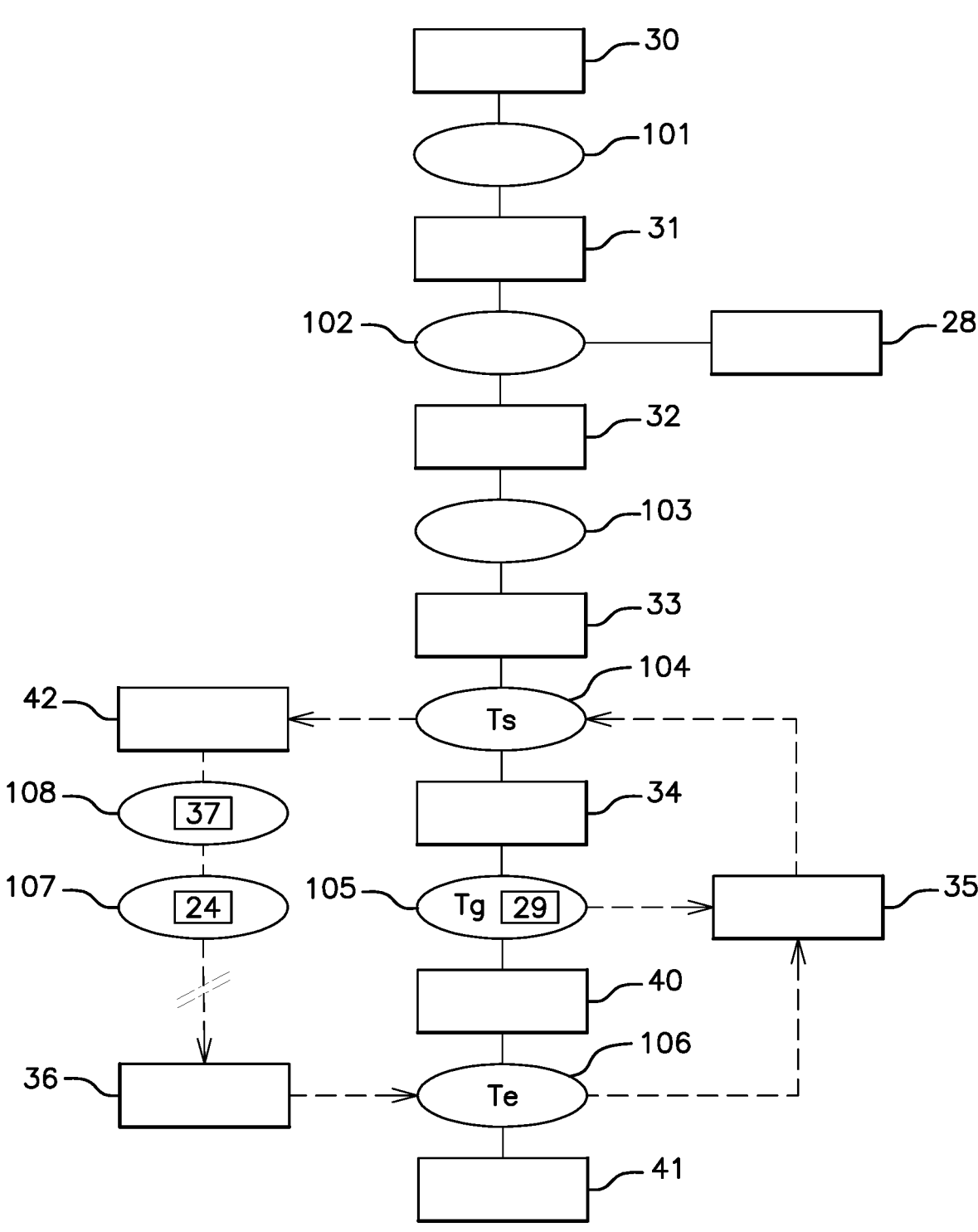
FIG. 4 is an overview diagram illustrating a particular embodiment of an acylation process according to the invention.

A detail 1 of an acylation reactor 1 according a fourth variant of the invention is shown in FIG. 3. In this detail, only said acylation chamber 5 is shown. Said acylation chamber 5 delimits an internal space 8 under a gaseous atmosphere in which the heating means 9 are placed at a distance from said hydroxylated/acylated material 30, 40 passing through said acylation chamber 5. The heating means 9 are suitable for bringing the temperature of the gaseous atmosphere of said acylation chamber 5 to said grafting temperature (Tg). The heating means 9 are without contact with said hydroxylated/acylated material 30, 40 so that the heating of said material is obtained on contact of the gaseous atmosphere heated to said grafting temperature (Tg). Said acylation chamber 5 comprises guide rolls 25 lying in the internal space 8 of said acylation chamber 5 and allowing said hydroxylated/acylated material 30, 40 to be guided in said acylation chamber 5 along a non-linear path. The guide rolls 25 make it possible to increase the residence time of the hydroxylated/acylated material 30, 40 in said acylation chamber 5 and the efficiency of the acylation reaction. In the embodiment shown, said acylation reactor 1 comprises blending means that are suitable for forming in said acylation chamber 5 an air stream, known as the cross stream 20, in a flow direction substantially parallel to the plane of the hydroxylated material 30 and substantially orthogonal to the scrolling direction 43 of the hydroxylated material 30. Said cross stream 20 is chosen so as not to substantially modify the stream of gaseous composition flowing from downstream to upstream in said acylation reactor. Needless to say, such means for blending and forming said cross stream 20 are controlled by the computer device 50 so that the concentration of fatty acid chloride in said cross stream 20 corresponds to the saturating vapour pressure of the fatty acid chloride at said grafting temperature (Tg).

An overview diagram of a variant of a process for the acylation of a solid material, referred to as the hydroxylated material 30, bearing hydroxyl groups (—OH), known as reaction-generating hydroxyls, which are accessible and capable of reacting with a fatty acid chloride 29 in gaseous form is shown in FIG. 5. Said hydroxylated material 30 may be a cellulose-based material. It may be a paper material or a cardboard material, notably corrugated cardboard. It may also be a fabric. Said hydroxylated material 30 may have an irregular and very rough surface state. It may or may not be porous. There is nothing to prevent said hydroxylated material 30 from being a calendered paper material having a uniform surface state with little roughness. It may also be a non-porous hydroxylated material having reaction-generating hydroxyls borne by at least one polymer bearing such reaction-generating hydroxyls. Such a polymer may be PVA (polyvinyl alcohol). Said hydroxylated material may have an outer surface coat formed from polyvinyl alcohol. In particular, it may be a cellulose-based material, in particular a paper material, which has been made airtight and non-porous by surface application of a coat of PVA. Said hydroxylated material is advantageously flexible, i.e. it is capable of deforming under the effect of its own weight. Said hydroxylated material may be a crosslinked paper material in which the rotational mobility of the cellulose fibres thus crosslinked is restricted and in which the mechanical strength properties in general and the wet strength properties in particular are improved. Said hydroxylated material may be a paper material that is crosslinked with at least one group of crosslinking atoms, for example crosslinked with 1-chloro-2,3-epoxypropane (epichlorohydrin).

In a process according to the invention, said hydroxylated material 30, for example in the form of a width conditioned as a roll, is scrolled in a scrolling direction parallel to the largest dimension of the width between a reel lying in the upstream part of said acylation reactor 1 and a member for collecting acylated material lying in the downstream part of said acylation reactor 1. In a process according to the invention, said scrolled hydroxylated material 30 is subjected to preheating 101. This preheating 101 may be performed by any means, for example by subjecting the hydroxylated material 30 to radiative heating by infrared radiation. The preheating 101 makes it possible to raise the temperature of said hydroxylated material 30 to a temperature which facilitates the deposition of the fatty acid chloride 28 in liquid form. A preheated hydroxylated material 31 is formed, which is ready to receive a composition 28 containing at least one fatty acid chloride.

A step 102 of continuous stationary deposition of such a composition 28 comprising at least one fatty acid chloride onto the hydroxylated material 31 is performed. The deposition composition 28 may comprise one or more fatty acid chlorides. It may be formed solely of at least one fatty acid chloride or of a single fatty acid chloride. The fatty acid chloride is chosen from the group formed by acid chlorides of formula R—CO—Cl in which R is a hydrocarbon-based chain having a number of carbon atoms of between 17 (limit inclusive) and 29 (limit inclusive), notably between 21 (limit inclusive) and 29 (limit inclusive). The fatty acid chloride may be behenic acid chloride (C22H43OCl) palmitic acid chloride (C16H31OCl) and/or stearic acid chloride (C18H35OCl). The deposition composition 28 is deposited onto one and/or the other of the two main faces of said hydroxylated material 31.

In a process according to the invention, an amount of fatty acid chloride per unit area of said hydroxylated material 30, 31 which is necessary and sufficient for the concentration of the fatty acid chloride in the gaseous atmosphere of said acylation chamber at said grafting temperature (Tg) to be such that the vapour pressure of the fatty acid chloride in the gaseous form is substantially equal to the saturating vapour pressure of the fatty acid chloride at said grafting temperature (Tg) is deposited on the surface of said hydroxylated material 31. In particular, an amount of fatty acid chloride chosen so that the fatty acid chloride is in slight stoichiometric excess relative to said reaction-generating hydroxyls of said hydroxylated material 30, 31 is deposited. For example, an amount of fatty acid chloride(s) of the order of 1.5 times the maximum amount of fatty acid chloride(s) that can be reacted with this same area of hydroxylated material 30, 31 is deposited per unit area of said hydroxylated material 30, 31. In particular, such a surface deposition of said hydroxylated material 30, 31 is performed with an amount of fatty acid chloride(s) deposited per square metre of hydroxylated material 30, 31 of between 20 mg/m2 and 1 g/m2.

In the embodiment shown in FIG. 5, the fatty acid chloride in liquid form is applied to the surface of said hydroxylated material prior to its entry into said acylation chamber. However, there is nothing to prevent envisaging to apply the fatty acid chloride in liquid form to the surface of said hydroxylated material during a phase 104 of drying of said hydroxylated material in said preheating chamber 16. There is nothing to prevent envisaging to apply the fatty acid chloride in liquid form to the surface of said hydroxylated material scrolling in said acylation chamber at said grafting temperature (Tg) or at a temperature close to said grafting temperature (Tg).

In certain embodiments of an acylation process according to the invention, step 102 comprises deposition of the fatty acid chloride composition 28 by means of a printing device chosen from the group formed from flexographic printing devices and rotogravure printing devices. By means of this deposition, a material, known as the printed material 32, coated with a fatty acid chloride and in which the acid chloride is spread on the surface of said printed material 32 in the form of discontinuous lumps is formed. When the deposition is performed using such a printing device, a step 103 of spreading and homogenizing this deposit is performed. This spreading step is performed by surface brushing by means of a spreading member having a contact surface formed from a velvet provided with velvet filiform elements that are unreactive towards the fatty acid chloride.

By means of this spreading step 103, a hydroxylated material 33 coated with a homogeneous and uniform deposit of the fatty acid chloride is formed. By virtue of its scrolling, the coated material 33 is introduced into said preheating chamber 16, the gaseous atmosphere of which is heated along a temperature gradient increasing from upstream to downstream. This results in a phase 104 of drying of said coated material 33 by loss of water in vapour form. The water vapour formed in said preheating chamber 16 is transported by an air stream flowing in said compartmentalized chamber 21 counter-currentwise relative to the coated material 33. This drying phase leads to a substantially dehydrated material 34. As a result of its scrolling, the dehydrated material 34 is introduced into said acylation chamber 5 brought to said grafting temperature (Tg). As a result of its scrolling, said dehydrated material 34 comes into contact with the gaseous atmosphere of said acylation chamber 5 which has a partial pressure of gaseous fatty acid chloride substantially equal to the saturating vapour pressure of the fatty acid chloride at said grafting temperature (Tg). Fatty acid chloride 29 in gaseous form reacts with said dehydrated material 34 to form an acylated material 40 by chromatogenic acylation reaction. As a result of this reaction, hydrochloric acid 35 is released into the gaseous atmosphere of said acylation chamber 5. The hydrochloric acid thus formed is entrained by the air stream 36 flowing in said acylation chamber 5 coming from said recycling chamber 12 and in the direction of said preheating chamber 16. Entrainment of the hydrochloric acid 35 out of said acylation chamber 5 promotes the acylation reaction. The acylation reaction by chromatogenic synthesis is maintained in said acylation chamber 5 due to the fact that the stream of gaseous composition 36 flowing counter-currentwise relative to the scrolling of the dehydrated/acylated material 34, 40 has a partial pressure of gaseous fatty acid chloride(s) 29 which is low and contributes towards the change to the gaseous state of the fatty acid chloride(s) in liquid form deposited on the hydroxylated/acylated material.

As a result of its scrolling, the acylated material 40 is introduced into said recycling chamber 12 which delimits an internal space 8 under a gaseous atmosphere maintained at said extraction temperature (Te) above said grafting temperature (Tg), but below the vaporization temperature of said at least one acid chloride. As a result of the increase in the temperature of the gaseous atmosphere between said acylation chamber 5 and said recycling chamber 12, fatty acid chloride is capable of passing, during an extraction phase 106, from the liquid state to the gaseous state in the gaseous atmosphere of said recycling chamber 12 and is entrained by the air stream 36 towards said acylation chamber 5. This results in extraction of fatty acid chloride in liquid form on said acylated material 40 and recycling of fatty acid chloride in gaseous and reactive form into said acylation chamber 5 at the grafting temperature (Tg). An acylated material 41 substantially free of free fatty acid chloride is formed on conclusion of the extraction phase 106.

In one embodiment not shown, the gaseous atmosphere of said recycling chamber is subjected to a blending treatment promoting evaporation of the liquid fatty acid chloride. In another embodiment not shown, an air knife, notably a hot air knife, known as the extraction knife, is applied to said acylated material downstream of said recycling chamber. Said extraction knife ensures a removal of residual fatty acid chloride from said acylated material which is as quantitative as possible. In certain embodiments, said extraction knife and the stream of gaseous composition are formed from a common air stream.

In the process according to the invention, the stream of gaseous composition 36, notably the stream of atmospheric air 36, is introduced into the downstream part of said compartmentalized chamber 21 and so as to flow in said compartmentalized chamber 21 counter-currentwise relative to the scrolling direction 43 of said hydroxylated/acylated material 30, 40. The air stream 36 flows in said recycling chamber 12 on contact with the heating means 15, whereby the stream of gaseous composition 36 reaches said recycling temperature (Tr). The direction of flow of the air stream 36 is represented in FIG. 5 by dashed-line arrows. The air stream 36, which is preheated where appropriate, is introduced into said recycling chamber 12, the gaseous atmosphere of which is maintained at said extraction temperature (Te). The air stream 36 at said extraction temperature (Te) passing through said recycling chamber 12 becomes charged with fatty acid chloride in gaseous form, of which the partial pressure in the gaseous atmosphere is necessarily less than (as a result of the extraction temperature (Te)) the saturating vapour pressure. It entrains into said acylation chamber 5 fatty acid chloride in gaseous form with a partial pressure that is necessarily greater than the saturating vapour pressure at said grafting temperature (Tg), leading to a condensation of fatty acid chloride in said acylation chamber 5 and to recycling of fatty acid chloride into said acylation chamber 5. Hydrochloric acid 35 formed as a result of the acylation reaction is entrained by the air stream 36 towards said preheating chamber 16. In said preheating chamber 16, the saturating vapour pressure of the fatty acid chloride in gaseous form decreases as a result of said preheating gradient, and fatty acid chloride passes from the gaseous state to the liquid state, such that fatty acid chloride in liquid form is recycled into said acylation reactor 1. The air stream 36 depleted in fatty acid chloride in gaseous form and enriched in hydrochloric acid 35 forms a stream of gaseous composition, known as the hydrochloric composition 42, comprising hydrochloric acid 35 and fatty acid chloride, which is unfit for discharge into the terrestrial atmosphere. In certain advantageous embodiments of a process according to the invention, a phase 108 of analysis of the components of said hydrochloric composition 42, and in particular a quantitative analysis of fatty acid chloride, is performed. The results of such an analysis 108 allow adjustment of at least one of the control parameters of the process and of said acylation reactor 1. A phase 107 of trapping the hydrochloric acid present in said hydrochloric composition 42 and of producing a stream of gaseous composition 36 that is fit for discharge into the terrestrial atmosphere or recycled into said acylation reactor 1 according to the invention is also performed.

In a process according to the invention, the gaseous fatty acid chloride present in the stream of atmospheric air exiting said compartmentalized chamber is quantified. Such a quantification makes it possible to reveal that an excessive amount of fatty acid chloride is deposited on said hydroxylated material and/or a fault in the recycling of the fatty acid chloride.

The process according to the invention makes it possible to form a hydrophobic acylated material. The hydrophobicity of said acylated material is qualified by the contact angle value of a drop of pure water deposited on said acylated material, the contact angle being the angle formed between the main plane of the acylated material and the right tangent to the surface of the drop of water at the point of contact of the drop of water on the acylated material. Typically, the value of the contact angle for an acylated material obtained via a process according to the invention is between 90° and 150°, the contact angle value of 150° corresponding to an acylated material that is particularly hydrophobic and water-repellent. The quality of the acylation and the hydrophobicity of said acylated material may be qualified by evaluating the time for which this contact angle value of between 90° and 150° is maintained at room temperature. The quality of the acylation and the hydrophobicity of said acylated material may also be qualified by means of the "test of leaktightness of the water pocket" in which the leaktightness of a water pocket formed from said acylated material is observed by measuring the water loss (taking the evaporation into account). The quality of the acylation and the hydrophobicity of said acylated material may also be qualified by means of the water repellency, i.e. the property of said acylated material to allow a drop of water formed on the surface of said acylated material to roll over the surface, adhering or not adhering to the surface of the acylated material. A satisfactory water repellency corresponds to a contact angle of about 150°.

Example 1—Comparison of the Acylation of a Hydroxylated Material which is or is not Impregnated with Stearic Acid Chloride Via a Stream of Air Saturated with Stearic Acid Chloride A closed vessel containing several pieces of the same nonwoven polymeric material impregnated with stearic acid chloride in a mass proportion of 2%, as stearic acid chloride diffuser, is placed in an oven maintained at 160° C. After 30 minutes, the liquid stearic acid chloride being equilibrated with the gaseous stearic acid chloride, two pieces of cellulose-based absorbent kitchen roll, one charged with stearic acid chloride and the other not charged with stearic acid chloride, are introduced. The two pieces of absorbent kitchen roll are kept in the closed vessel for 2 minutes. The two pieces are removed from the vessel. Their hydrophobicity is analysed by means of said "water pocket leaktightness test". The piece initially impregnated with stearic acid chloride appears perfectly hydrophobic with total impermeability maintained over time. In contrast, the piece not initially impregnated with stearic acid chloride appears only sparingly hydrophobic and not leaktight during said leaktightness test. This example shows that placing a gaseous phase saturated with stearic acid chloride in contact with a piece of paper not charged with reagent allows the grafting of the paper sample but with lower efficacy. Conversely, a paper sample charged with reagent and placed in a chamber saturated with reagent reacts very satisfactorily.

Example 2—Comparison of the Acylation of a Hydroxylated Material which is Impregnated with Stearic Acid Chloride Via a Stream of Air not Saturated with Stearic Acid Chloride A piece of cellulose-based absorbent kitchen roll impregnated with stearic acid chloride in a proportion of 0.5% weight/weight is placed on the end piece of a vacuum cleaner, used as air stream generator, and then heated by means of a hairdryer propelling air at a temperature of the order of 150° C. The piece of absorbent kitchen roll is then placed in an oven maintained at a temperature of 150° C. and its hydrophobicity is then tested by dipping it into water. The zone corresponding to the application of the vacuum cleaner end piece appears only slightly hydrophobic and wet, the peripheral zone of the piece appearing perfectly hydrophobic. This example shows that a stream of gaseous composition free of stearic acid chloride applied to a cellulose-based material of paper type leads to the removal of the stearic acid chloride and does not allow acylation.

Example 3—Comparison of the Effect of Heating by Contact with a Hot Surface and of the Effect of Heating without Contact with a Hot Surface on the Acylation of a Hydroxylated Material Impregnated with Stearic Acid Chloride A piece of cellulose-based absorbent kitchen roll impregnated with stearic acid chloride is placed on a rigid flat surface and an iron heating at a temperature of 200° C. is applied to the upper face of said piece. Browning of the piece of cellulose-based absorbent kitchen roll is immediately observed. For comparison, an identical piece of cellulose-based absorbent kitchen roll impregnated with stearic acid chloride is placed in an oven maintained at a temperature of 200° C. No browning is observed for an equivalent heating time. This example shows that a piece of cellulose-based material subjected to a high temperature in the presence of hydrochloric acid is degraded, whereas an equivalent piece placed at the same temperature in a hot gaseous phase does not show this degradation and remains intact.

EXAMPLE 4—An example of a process according to the invention is described below. A width of paper as hydroxylated material, with a basis weight of 100 g/m2 and a width of 2 m, is scrolled at a speed of 10 m/s through an acylation chamber whose atmosphere is maintained at a temperature of 180° C. The scrolling speed of the width in said acylation chamber is 10 m/s. An amount of stearic acid chloride in liquid form in a proportion of 0.2 g of stearic acid chloride per square metre (m2) of scrolling paper is applied continuously to one of the faces of the scrolling paper, upstream of said acylation chamber. 4 g of stearic acid chloride are thus deposited per second. A stream of 10 L/s of atmospheric air as gaseous composition flowing counter-currentwise relative to the paper is established in said acylation chamber. The air stream in said acylation chamber entrains 1.17 g of gaseous stearic acid chloride per second in a proportion of 0.117 g/L of gaseous stearic acid chloride in the gaseous stream, considering that the concentration of gaseous stearic acid chloride at the saturating vapour pressure is 117 g/m3 at a temperature of 180° C. The non-gaseous stearic acid chloride remaining on the paper reacts with said reaction-generating hydroxyls of the paper by passing via the liquid/vapour transition state. During this reaction, 0.28 g/s of gaseous hydrochloric acid are released into the stream of gaseous composition in a proportion of 0.028 g/L.

Continuous assay of the hydrochloric acid released into the air stream as a result of the acylation reaction constitutes a reliable indicator of the acylation reaction progress. A low concentration is representative of a sparingly efficient grafting reaction. A high concentration may be indicative of abnormal degradation of the stearic acid chloride, for example of excessively high humidity of the paper.

Assay of the concentration of the stearic acid chloride in different zones of the acylation reactor also allows chemical "monitoring" of the acylation process. A concentration of stearic acid chloride in the gaseous atmosphere of the acylation chamber which is less than the concentration corresponding to the saturating vapour pressure may indicate that the amount of stearic acid chloride deposited on the surface of the paper is insufficient or that the air stream is too high. An excessively high concentration of stearic acid chloride in the air stream exiting said acylation chamber may be indicative of excessive deposition of stearic acid chloride. Continuous determination of the concentrations of hydrochloric acid and of stearic acid chloride throughout the acylation reactor and in the course of the various phases of the process is essential for controlling and optimizing the conditions of this reaction.

For the purposes of optimizing the acylation reaction, the scrolling speed of the width of paper, the grafting temperature (Tg) and the air stream are notably adjusted so that the concentration of hydrochloric acid released into the air stream escaping from said acylation chamber tends to correspond as closely as possible to the amount of stearic acid chloride deposited on the surface of the paper, indicating an optimum reaction yield. This correspondence makes it possible to determine whether the reaction is proceeding optimally and to optimize the progress thereof, where appropriate. A concentration of gaseous hydrochloric acid released into the air stream which is lower than the maximum theoretical concentration taking into account the amount of stearic acid chloride deposited constitutes an indicator of non-optimal reaction conditions. These non-optimal reaction conditions may be associated with a concentration of stearic acid chloride in the acylation chamber which is lower than the concentration corresponding to the saturating vapour pressure. This concentration of stearic acid chloride is measured in said acylation chamber via conventional analytical means, for example using a flame ionization detector. The temperature of the gaseous atmosphere in said acylation chamber and/or the air stream and/or the scrolling speed of the width of paper in said acylation chamber should then be adjusted.

There is nothing to prevent envisaging to increase the residence time of the width of paper in said acylation chamber by increasing the path length travelled by the width of paper in said acylation chamber by means of bar feeds. Simultaneous analysis of the concentration of hydrochloric acid and of the concentration of stearic acid chloride that are entrained in the air stream allows optimal adjustment of the control parameters of the acylation reactor and of control of the acylation process.

In particular, it is essential to control said grafting temperature (Tg) in said acylation chamber, said extraction temperature (Te) in said recycling chamber and/or said preheating gradient according to the fatty acid chloride used. In this regard, the saturating vapour pressure of stearic acid chloride is only 59 g/m3 at 160° C., but is 117 g/m3 at 180° C. The saturating vapour pressure of palmitic acid chloride is 107 g/m3 at 160° C. and 205 g/m3 at 180° C. Fine control of the thermal and rheological conditions of the gases in said acylation chamber is essential for taking these variations into account.

In parallel, the detection of entrained stearic acid chloride in high concentration in the air stream upstream of said acylation chamber constitutes an indicator of non-optimal reaction conditions or of excessive deposition of stearic acid chloride. However, the detection of a low concentration of stearic acid chloride entrained in the air stream upstream of said acylation chamber, combined with a concentration of hydrochloric acid tending to correspond as closely as possible to the amount of stearic acid chloride deposited on the width of paper constitutes an indicator of optimized reaction conditions.

The invention may be the subject of numerous variants and applications other than those described hereinabove. In particular, it goes without saying that, unless otherwise indicated, the various structural and functional characteristics of each of the embodiments described hereinabove must not be considered as combined and/or strictly and/or inextricably linked to each other, but, on the contrary, as simple juxtapositions. In addition, the structural and/or functional characteristics of the various embodiments described hereinabove may form the subject totally or partly of any different juxtaposition or of any different combination.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A process for acylation of a hydroxylated material bearing a hydroxyl group that is accessible and capable of reacting with at least one fatty acid chloride in gaseous form, the process comprising the steps of:

scrolling the hydroxylated material through an acylation chamber that is configured to delimit an internal space under a gaseous atmosphere;

applying a liquid form of a fatty acid chloride to a surface of the scrolled hydroxylated material;

heating the gaseous atmosphere of the acylation chamber so that a temperature of the gaseous atmosphere that is in contact with the scrolled hydroxylated material in the acylation chamber is at a grafting temperature (Tg), the Tg being below a vaporization temperature of the fatty acid chloride and sufficient to allow acylation of the hydroxylated material to pass through the acylation chamber;

maintaining a stream of a gaseous composition flowing from downstream to upstream in the acylation chamber counter-currentwise relative to the scrolled hydroxylated material;

forming an acylated material as a result of an acylation reaction by covalent grafting taking place in the acylation chamber between at least a portion of the hydroxyl group and fatty acid chloride in gaseous form; and entraining a hydrochloric acid produced as a result of the acylation reaction from downstream to upstream by the stream of the gaseous composition;

wherein the stream of the gaseous composition is adjusted so that the fatty acid chloride is maintained in the gaseous atmosphere of the acylation chamber at a concentration such that the fatty acid chloride in gaseous form is present in the gaseous atmosphere of the acylation chamber with a partial pressure substantially equal to a saturating vapor pressure of the fatty acid chloride at the grafting temperature (Tg).

2. The process according to claim 1, wherein the fatty acid chloride and the hydrochloric acid are quantified in at least one fluid chosen from the stream of the gaseous composition exiting the acylation chamber and the gaseous atmosphere of the acylation chamber; and wherein at least one parameter is chosen from the group formed from:

an amount of the fatty acid chloride applied per unit area of the scrolled hydroxylated material;

a scrolling speed of the hydroxylated material through the acylation chamber;

a residence time of the hydroxylated material in the acylation chamber;

the stream of gaseous composition;

the temperature of the gaseous composition; and the grafting temperature (Tg) in the acylation chamber;

is adjusted as a function of this quantification so as:

to maximize the concentration of gaseous hydrochloric acid; and to minimize the concentration of fatty acid chloride;

in the stream of gaseous composition upstream of the acylation chamber.

3. The process according to claim 1, wherein the scrolled acylated material is subjected to recycling of an excess fatty acid chloride, in which:

the scrolled acylated material passes through a recycling chamber, lying downstream of the acylation chamber and delimiting an internal space under a gaseous atmosphere;

the gaseous atmosphere of the recycling chamber being brought to an extraction temperature (Te), above the grafting temperature (Tg) and below the vaporization temperature of each fatty acid chloride; and the stream of gaseous composition flows in the recycling chamber counter-currentwise relative to the scrolling of the acylated material and then in the acylation chamber such that excess fatty acid chloride entrained by the acylated material into the recycling chamber and vaporized as a result of the extraction temperature (Te) is recycled in gaseous form into the acylation chamber.

4. The process according to claim 1, wherein the scrolled hydroxylated material is subjected to preheating in a preheating chamber, arranged upstream of the acylation chamber and delimiting an internal space under a gaseous atmosphere, which is suitable for the passage therethrough of the scrolling hydroxylated material;

the gaseous atmosphere of the preheating chamber having an increasing temperature gradient or preheating gradient, lying between an upstream inlet for the hydroxylated material into the preheating chamber and a downstream outlet for the hydroxylated material towards the acylation chamber.

5. The process according to claim 3, wherein the hydroxylated/acylated material is scrolled through a compartmentalized chamber, between an upstream inlet and a downstream outlet of the compartmentalized chamber, in which:

a first compartment of the compartmentalized chamber is formed by a preheating chamber lying in an upstream part of the compartmentalized chamber;

a second compartment of the compartmentalized chamber is formed by the recycling chamber lying in a downstream part of the compartmentalized chamber; and a third compartment of the compartmentalized chamber is formed by the acylation chamber positioned between the preheating chamber and the recycling chamber;

so that the hydroxylated/acylated material passes through the preheating chamber, the acylation chamber and the recycling chamber from upstream to downstream.

6. An acylation reactor for acylation of a hydroxylated material bearing a hydroxyl group that is accessible and capable of reacting with a fatty acid chloride in gaseous form, the acylation reactor comprising:

a means for scrolling the hydroxylated material between a reel of the hydroxylated material lying in an upstream part of the acylation reactor and a member for collecting an acylated material lying in a downstream part of the acylation reactor;

an acylation chamber, the acylation chamber being suitable for a passage therethrough of the hydroxylated material scrolled between an upstream inlet and a downstream outlet of the acylation chamber, being suitable for delimiting a space under a gaseous atmosphere, and being equipped with means for heating this gaseous atmosphere at a grafting temperature (Tg), below the-vaporization temperature of the fatty acid chloride and capable of allowing acylation of the hydroxylated material passing through the acylation chamber;

an applicator device for applying a fatty acid chloride in liquid form to a surface of the scrolled hydroxylated material, the applicator device lying upstream of the acylation chamber; and means for establishing a stream of gaseous composition, the means are adapted so that the stream of gaseous composition passes through the acylation chamber from downstream to upstream of the acylation chamber and counter-currentwise relative to the scrolling of the hydroxylated material;

wherein the acylation reactor comprises means for adjusting the stream of gaseous composition, the means are suitable for maintaining in the gaseous atmosphere of the acylation chamber a concentration of fatty acid chloride such that fatty acid chloride in gaseous form is present in the gaseous atmosphere of the acylation chamber with a partial pressure substantially equal to the saturating vapor pressure of the fatty acid chloride at the grafting temperature (Tg).

7. The acylation reactor according to claim 6, further comprising an analytical device suitable for analyzing and quantifying chemical species present in the stream of gaseous composition, the analytical device being capable of producing quantification data representative of the concentration of the fatty acid chloride and of the concentration of hydrochloric acid in the stream of gaseous composition.

8. The acylation reactor according to claim 7, further comprising a computer means configured to receive the quantification data and to control, using the quantification data, at least one member of the acylation reactor, chosen from the group formed by:

a means for scrolling the hydroxylated material;

the applicator device for applying the fatty acid chloride to the surface of the hydroxylated material;

a means for heating the gaseous atmosphere of the acylation chamber to the grafting temperature (Tg);

a means for heating the gaseous atmosphere of a recycling chamber to a recycling temperature (Tr);

a means for heating the gaseous atmosphere of a preheating chamber on a preheating gradient;

a means for establishing the stream of gaseous composition; and a means for controlling the temperature of the gaseous composition.

9. The acylation reactor according to claim 6, further comprising a recycling chamber, the recycling chamber being arranged downstream of the acylation chamber, delimiting a space under a gaseous atmosphere and suitable for a passage therethrough of the acylated material scrolling between an upstream inlet and a downstream outlet of the recycling chamber, the acylation chamber and recycling chamber being in communication with gaseous composition so that the stream of gaseous composition passing through the acylation chamber from downstream to upstream of the acylation reactor first passes through the recycling chamber and then the acylation chamber and counter-currentwise relative to the scrolling of the acylated material;

wherein the recycling chamber comprises means for heating the gaseous atmosphere of the recycling chamber to an extraction temperature (Te), above the grafting temperature (Tg) and below the vaporization temperature of the fatty acid chloride.

10. The acylation reactor according to claim 6, further comprising a preheating chamber, arranged upstream of the acylation chamber, which is suitable for the passage therethrough of the hydroxylated material scrolling between an upstream inlet and a downstream outlet of the preheating chamber and delimiting an internal space under a gaseous atmosphere;

wherein the preheating chamber is equipped with means for heating the gaseous atmosphere of the preheating chamber along an increasing temperature gradient or a preheating gradient, lying between an upstream inlet for the hydroxylated material into the preheating chamber and a downstream outlet for the hydroxylated material out of the preheating chamber.

11. The acylation reactor according to claim 6, wherein the acylation reactor is formed from a compartmentalized chamber through which longitudinally passes the hydroxylated/acylated material scrolled between an inlet and an outlet of the compartmentalized chamber, a first compartment of the compartmentalized chamber being formed by a preheating chamber lying in an upstream part of the compartmentalized chamber, a second compartment of the compartmentalized chamber being formed by a recycling chamber lying in a downstream part of the compartmentalized chamber, and a third compartment of the compartmentalized chamber being formed by the acylation chamber lying in an intermediate part of the compartmentalized chamber, positioned between the preheating chamber and the recycling chamber.

12. The acylation reactor according to claim 6, wherein the acylation reactor is equipped with a member for retaining a hydrochloric acid entrained with the stream of gaseous composition and for releasing a stream of gaseous composition substantially free of the hydrochloric acid.

13. The acylation reactor according to claim 11, wherein at least one from among the preheating chamber, the acylation chamber, and the recycling chamber is equipped with a plurality of rolls for guiding the hydroxylated/acylated material scrolled in the acylation reactor, the plurality of rolls is positioned so as to guide the scrolled hydroxylated/acylated material along a non-linear path.

14. The acylation reactor according to claim 6, wherein the applicator device for applying the fatty acid chloride in liquid form to the surface of the hydroxylated material comprises a device for spreading the fatty acid chloride on the surface of the hydroxylated material, the spreading device being a rotating spreading device having an application surface formed from a velvet provided with velvet filiform elements, which are unreactive towards the fatty acid chloride and are capable of:

taking up fatty acid chloride by contact with the fatty acid chloride; and releasing fatty acid chloride on contact of the hydroxylated material, by contact of the velvet filiform elements with the hydroxylated material.

\* \* \* \* \*